United States Patent
Prutchi et al.

(10) Patent No.: US 12,521,559 B2
(45) Date of Patent: Jan. 13, 2026

(54) METHODS FOR PLANNING AND DELIVERING CARDIAC ELECTRICAL STIMULATION

(71) Applicant: Impulse Dynamics NV, Willemstad (CW)

(72) Inventors: David Prutchi, Voorhees, NJ (US); Simeon Ioannis Kedikoglou, Tallahassee, FL (US); Angela Connolly Stagg, Allendale, NJ (US); Tamir Ben David, Tel-Aviv (IL)

(73) Assignee: Impulse Dynamics NV, Willemstad (CW)

( * ) Notice: Subject to any disclaimer, the term of this patent is extended or adjusted under 35 U.S.C. 154(b) by 720 days.

(21) Appl. No.: 17/770,707

(22) PCT Filed: Oct. 22, 2020

(86) PCT No.: PCT/IB2020/059947
§ 371 (c)(1),
(2) Date: Apr. 21, 2022

(87) PCT Pub. No.: WO2021/079318
PCT Pub. Date: Apr. 29, 2021

(65) Prior Publication Data
US 2022/0379120 A1 Dec. 1, 2022

Related U.S. Application Data

(60) Provisional application No. 62/924,782, filed on Oct. 23, 2019, provisional application No. 62/924,776, (Continued)

(51) Int. Cl.
A61N 1/365 (2006.01)
A61N 1/362 (2006.01)

(52) U.S. Cl.
CPC ....... *A61N 1/36585* (2013.01); *A61N 1/3624* (2013.01); *A61N 1/3628* (2013.01); *A61N 1/36592* (2013.01)

(58) Field of Classification Search
None
See application file for complete search history.

(56) References Cited

U.S. PATENT DOCUMENTS 4,554,922 A 11/1985 Prystowsky et al.
5,372,607 A 12/1994 Stone et al.
(Continued)

FOREIGN PATENT DOCUMENTS

CA 2459408 3/2003
CN 1787850 6/2006
(Continued)

OTHER PUBLICATIONS

Interview Summary Dated Nov. 12, 2024 from the US Patent and Trademark Office Re. U.S. Appl. No. 17/857,085. (8 pages).
(Continued)

*Primary Examiner* — Mallika D Fairchild

(57) ABSTRACT

A system for cardiac electrical stimulation treatment, comprising: an implantable pulse generator; one or more leads extending from the pulse generator to the heart for applying cardiac electrical stimulation; a controller programmed with at least one treatment plan for applying cardiac electrical stimulations, the controller configured to automatically update the treatment plan in response to actual cardiac activity by updating one or more parameters including: a time period during which cardiac electrical stimulations are applied; a rate of cardiac electrical stimulations; an amount of energy delivered at each cardiac electrical stimulation.

32 Claims, 8 Drawing Sheets

Related U.S. Application Data filed on Oct. 23, 2019, provisional application No. 63/042,061, filed on Jun. 22, 2020, provisional application No. 63/001,343, filed on Mar. 29, 2020.

(56) References Cited

U.S. PATENT DOCUMENTS

| | | | |
|---|---|---|---|
| 6,233,487 | B1 | 5/2001 | Mika et al. |
| 6,263,242 | B1 | 7/2001 | Mika et al. |
| 6,269,268 | B1* | 7/2001 | Callaghan ............ A61N 1/3706 |
| | | | 607/19 |
| 6,370,430 | B1 | 4/2002 | Mika et al. |
| 6,480,737 | B1 | 11/2002 | Policker et al. |
| 6,597,952 | B1 | 7/2003 | Mika et al. |
| 6,725,093 | B1 | 4/2004 | Ben-Haim et al. |
| 6,993,385 | B1 | 1/2006 | Routh et al. |
| 7,027,863 | B1 | 4/2006 | Prutchi et al. |
| 7,519,426 | B1 | 4/2009 | Koh et al. |
| 7,634,310 | B2 | 12/2009 | Lee et al. |
| 7,953,481 | B1 | 5/2011 | Shemer et al. |
| 7,991,469 | B2 | 8/2011 | Schwartz et al. |
| 8,634,910 | B2 | 1/2014 | Stahmann |
| 8,977,353 | B2 | 3/2015 | Rousso et al. |
| 9,713,723 | B2 | 7/2017 | Shemer et al. |
| 10,207,110 | B1 | 2/2019 | Gelfand et al. |
| 2003/0036777 | A1 | 2/2003 | Sheth et al. |
| 2004/0127804 | A1 | 7/2004 | Hatlesad et al. |
| 2005/0039745 | A1 | 2/2005 | Stahmann et al. |
| 2005/0085867 | A1 | 4/2005 | Tehrani et al. |
| 2005/0090871 | A1 | 4/2005 | Cho et al. |
| 2006/0100668 | A1 | 5/2006 | Ben-David et al. |
| 2006/0224190 | A1 | 10/2006 | Gill et al. |
| 2007/0060962 | A1 | 3/2007 | Pappone |
| 2007/0162079 | A1* | 7/2007 | Shemer ................ A61N 1/3627 |
| | | | 607/9 |
| 2008/0021336 | A1 | 1/2008 | Dobak, III |
| 2008/0103532 | A1 | 5/2008 | Armstrong et al. |
| 2008/0114411 | A1 | 5/2008 | Lian et al. |
| 2008/0275520 | A1 | 11/2008 | Hopper et al. |
| 2009/0030471 | A1 | 1/2009 | Rousso et al. |
| 2009/0062882 | A1 | 3/2009 | Zhang et al. |
| 2009/0248101 | A1 | 10/2009 | Anker |
| 2009/0287103 | A1 | 11/2009 | Pillai |
| 2010/0069977 | A1 | 3/2010 | Stahmann |
| 2010/0069985 | A1 | 3/2010 | Stahmann |
| 2010/0087892 | A1 | 4/2010 | Stubbs et al. |
| 2010/0248288 | A1 | 9/2010 | Iiess et al. |
| 2010/0305647 | A1 | 12/2010 | McCabe et al. |
| 2011/0152956 | A1 | 6/2011 | Hincapie-Ordonez et al. |
| 2013/0006319 | A1 | 1/2013 | Doerr |
| 2013/0138006 | A1 | 5/2013 | Bornzin et al. |
| 2013/0218222 | A1 | 8/2013 | Doerr |
| 2013/0245722 | A1 | 9/2013 | Ternes et al. |
| 2014/0046392 | A1* | 2/2014 | Stubbs .................... A61N 1/371 |
| | | | 607/11 |
| 2016/0045732 | A1 | 2/2016 | Grenz et al. |
| 2017/0245794 | A1* | 8/2017 | Sharma .................. A61B 5/686 |
| 2017/0348524 | A1 | 12/2017 | Matos |
| 2018/0214698 | A1 | 8/2018 | Cuchiara |
| 2019/0060632 | A1 | 2/2019 | Asirvatham et al. |
| 2019/0329043 | A1* | 10/2019 | Sharma .............. A61N 1/37252 |
| 2019/0329052 | A1 | 10/2019 | Kim et al. |
| 2022/0387790 | A1 | 12/2022 | Prutchi et al. |
| 2022/0387795 | A1 | 12/2022 | Prutchi et al. |
| 2023/0001204 | A1 | 1/2023 | Prutchi et al. |
| 2023/0173280 | A1 | 6/2023 | Prutchi et al. |

FOREIGN PATENT DOCUMENTS

| | | |
|---|---|---|
| CN | 1882296 | 12/2006 |
| CN | 101827629 | 9/2010 |
| CN | 104321107 | 1/2015 |
| CN | 105813687 | 7/2016 |
| CN | 107261324 | 10/2017 |
| EP | 0334675 | 9/1989 |
| EP | 0600631 | 6/1994 |
| EP | 0910429 | 4/1999 |
| EP | 2659931 | 11/2013 |
| JP | 2007-503286 | 2/2007 |
| JP | 2008-532630 | 8/2008 |
| JP | 2010-104750 | 5/2010 |
| JP | 2011-502552 | 1/2011 |
| JP | 2012-502729 | 2/2012 |
| JP | 2012-504468 | 2/2012 |
| JP | 2015-503397 | 2/2015 |
| WO | WO 2004/080533 | 9/2004 |
| WO | WO 2010/039877 | 4/2010 |
| WO | WO 2021/079316 | 4/2021 |
| WO | WO 2021/079318 | 4/2021 |
| WO | WO 2021/079319 | 4/2021 |
| WO | WO 2021/198755 | 10/2021 |

OTHER PUBLICATIONS

International Search Report and the Written Opinion Dated Feb. 4, 2021 From the International Searching Authority Re. Application No. PCT/IB2020/059949. (14 Pages).

International Search Report and the Written Opinion Dated Aug. 12, 2021 From the International Searching Authority Re. Application No. PCT/IB2020/059947. (16 Pages).

International Search Report and the Written Opinion Dated Jan. 14, 2021 From the International Searching Authority Re. Application No. PCT/IB2020/059943. (17 Pages).

International Search Report and the Written Opinion Dated Aug. 20, 2021 From the International Searching Authority Re. Application No. PCT/IB2020/059944. (18 Pages).

Invitation to Pay Additional Fees, Communication Relating to the Result of the Partial International Search and the Provisional Opinion Dated Apr. 20, 2021 From the International Searching Authority Re. Application No. PCT/IB2020/059944. (9 Pages).

Invitation to Pay Additional Fees, Communication Relating to the Result of the Partial International Search and the Provisional Opinion Dated Apr. 26, 2021 From the International Searching Authority Re. Application No. PCT/IB2020/059947. (9 Pages).

Written Opinion Dated Mar. 15, 2022 From the International Searching Authority Re. Application No. PCT/IB2020/059944. (9 Pages).

Abi-Samra et al. "Cardiac Contractility Modulation: A Novel Approach for the Treatment of Heart Failure", Heart Fail Reviews 21:645-660, Jul. 9, 2016.

Abraham et al. "A Randomized Controlled Trial to Evaluate the Safety and Efficacy of Cardiac Contractility Modulation in Patients With Moderately Reduced Left Ventricular Ejection Fraction and a Narrow QRS Duration: Study Rationale and Design", Journal of Cardiac Failure, 21(1): 16-23, Jan. 2015.

Abraham et al. "A Randomized Controlled Trial to Evaluate the Safety and Efficacy of Cardiac Contractility Modulation", Journal of the American College of Cardiology, JACC: Heart Failure, 6(10): 874-883, Published Online May 10, 2018.

Abraham et al. "Subgroup Analysis of a Randomized Controlled Trial Evaluating the Safety and Efficacy of Cardiac Contractility Modulation in Advanced Heart Failure", Journal of Cardiac Failure, 17(9): 710-717, Published Online Jun. 22, 2011.

Anker et al. "Cardiac Contractility Modulation Improves Long-Term Survival and Hospitalizations in Heart Failure With Reduced Ejection Fraction", European Journal of Heart Failure, 21(9): 1103-1113, Published Online Jan. 16, 2019.

Borggrefe et al. "Randomized, Double Blind Study of Non-Excitatory, Cardiac Contractility Modulation Electrical Impulses for Symptomatic Heart Failure", European Heart Journal, 29(8): 1019-1028, Published Online Feb. 12, 2008.

Giallauria et al. "Effects of Cardiac Contractility Modulation by Non-Excitatory Electrical Simulation on Exercise Capacity and Quality of Life: An Individual Patient's Data Meta-Analysis of Randomized Controlled Trials", International Journal of Cardiology, XP028880522, 175(2): 352-357, Available Online Jun. 19, 2014.

(56) References Cited

OTHER PUBLICATIONS

Ibrahim et al. "Power Prior Distributions for Regression Models", Statistical Science, 15(1): 46-60, Feb. 2000.
Kadish et al. "A Randomized Controlled Trial Evaluating the Safety and Efficacy of Cardiac Contractility Modulation in Advanced Heart Failure", American Heart Journal, 161(2): 329-337, Feb. 2011.
Kuschyk et al. "Efficacy and Survival in Patients With Cardiac Contractility Modulation: Long-Term Single Center Experience in 81 Patients", International Journal of Cardiology, 183: 76-81, Available Online Jan. 20, 2015.
Liu et al. "Improvement of Long-Term Survival by Cardiac Contractility Modulation in Heart Failure Patients: A Case-Control Study", International Journal of Cardiology, 206: 122-126, Available On line Jan. 6, 2016.
Lyon et al. "Cardiac Contractility Modulation Therapy in Advanced Systolic Heart Failure", Nature Reviews Cardiology, XP0557621686, 10(10): 584-598, Advance Online Publication Aug. 13, 2013.
Mando et al. "Outcomes of Cardiac Contractility Modulation: A Systemic Review and Meta-Analysis of Randomized Clinical Trials", Cardiovascular Therapeutics, 2019(Art.ID 9769724): 1-10, Jun. 17, 2019.
Mueller et al. "Clinical Effects of Long-Term Cardiac Contractility Modulation (CCM) in Subjects With Heart Failure Caused by Left Ventricular Systolic Dysfunction", Clinical Research of Cardiology, 106(11): 893-904, Published Online Jul. 6, 2017.
Neelagaru et al. "Nonexcitatory, Cardiac Contractility Modulation Electrical Impulses: Feasibility Study for Advanced Heart Failure in Patients With Normal QRS Duration", Heart Rythm, 3(10): 1140-1147, Published Online Jul. 8, 2006.
Schoene et al. "Cardiac Contractility Modulation Provides Improved Ventilatory Efficiency and Reduces Oscillatory Breathing Pattern", European Heart Journal, Poster Session 4: Advanced Heart Failure, 40(Suppl.1): 2133: # P3523, Oct. 21, 2019.
Schuirmann "Pharmacometrics: A Comparison of the Two One-Sided Tests Procedure and the Power Approach for Assessing the Equivalence of Average Bioavailability", Journal of Pharmacokinetics and Biopharmaceutics, 15(6): 657-680, Dec. 1987.
Tint et al. "New Generation Cardiac Contractility Modulation Device—Filling the Gap in Heart Failure Treatment", Journal of Clinical Medicine, 8(5): 588-1-588-10, Apr. 29, 2019.
Tschoepe et al. "Cardiac Contractility Modulation: Mechanisms of Action in Heart Failure with Reduced Ejection Fraction and Beyond", European Journal of Heart Failure, 21(1):14-20, Nov. 28, 2018.
Uskach et al. "Possibilities and Perspectives of Using Cardiac Contractility Modulation in Patients With Chronic Heart Failure and Atrial Fibrillation", Kardiologiia, 59(2S): 4-14, 2019 & English Abstract.
Wang et al. "Meta-Analysis of the Incidence of Lead Dislodgement With Conventional and Leadless Pacemaker Systems", Pacing and Clinical Electrophysiology, Pace, 41(10): 1365-1371, Published Online Aug. 27, 2018.
Yu et al. "Impact of Cardiac Contractility Modulation on Left Ventricular Global and Regional Function and Remodeling", Journal of the American College of Cardiology, JACC: Cardiovascular Imaging, 2(12): 1341-1349, Dec. 2009.
Notice of Reason(s) for Rejection Dated Jun. 11, 2024 From the Japan Patent Office Re. Application No. 2022-523998 and Its Translation Into English. (10 Pages).
Notice of Reason(s) for Rejection Dated Jun. 6, 2024 From the Japan Patent Office Re. Application No. 2022-523513 and Its Translation Into English. (12 Pages).
Notice of Reason(s) for Rejection Dated 28-May 2024 From the Japan Patent Office Re. Application No. 2022-523514 and Its Translation Into English. (14 Pages).
Notice of Reason(s) for Rejection Dated Mar. 4, 2025 From the Japan Patent Office Re. Application No. 2022-523514 and Its Translation Into English. (12 Pages).
Notice of Reason(s) for Rejection Dated Feb. 12, 2025 From the Japan Patent Office Re. Application No. 2022-523998 and Its Translation Into English. (9 Pages).

Official Action Dated Feb. 6, 2025 from the US Patent and Trademark Office Re. U.S. Appl. No. 17/911,676. (48 pages).
Restriction Official Action Dated Dec. 30, 2024 from the US Patent and Trademark Office Re. U.S. Appl. No. 17/770,318. (5 pages).
Oliver et al. "Anatomy, Thorax, Phrenic Nerves", Europe PMC, Search life-sciences literature, Study Guide from StatPearls Publishing, Treasure Island (FL), PMID: 30020697, Jul. 19, 2018. dowloaded from https://europepmc.org/article/nbk/nbk513325.
El Shear "Novel Paradigms in the Therapeutic Management of Heart Failure With Preserved Ejection Fraction: Clinical Perspectives", American Journal of Cardiovascular Disease, 9(5): 91-108, Oct. 15, 2019.
Tschöpe et al. "Cardiac Contractility Modulation Signals Improve Exercise Intolerance and Maladaptive Regulation of Cardiac Key Proteins for Systolic and Diastolic Function in HFpEF", International Journal of Cardiology, 203: 1061-1066, Available Online Oct. 27, 2015.
Zile et al. "New Concepts in Diastolic Dysfunction and Diastolic Heart Failure: Part I. Diagnosis, Prognosis, and Measurements of Diastolic Function", Circulation, 105(11): 1387-1393, Mar. 19, 2002.
Zile et al. "New Concepts in Diastolic Dysfunction and Diastolic Heart Failure: Part II. Causal Mechanisms and Treatment", Circulation, 105(12): 1503-1508, Mar. 26, 2002.
Official Action Dated Mar. 20, 2024 from the US Patent and Trademark Office Re. U.S. Appl. No. 17/770,329. (39 pages).
Additional Search Fees Due under Rule 164(2)(a) EPC Dated Feb. 26, 2025 From the European Patent Office Re. Application No. 20803263.1 (5 pages).
Communication Pursuant to Article 94(3) EPC Dated Dec. 22, 2023 From the European Patent Office Re. Application No. 20801017.3 (4 Pages).
International Preliminary Report on Patentability Dated May 5, 2022 From the International Bureau of WIPO Re. Application No. PCT/IB2020/059943. (8 Pages).
International Preliminary Report on Patentability Dated May 5, 2022 From the International Bureau of WIPO Re. Application No. PCT/IB2020/059947. (10 Pages).
International Preliminary Report on Patentability Dated May 5, 2022 From the International Bureau of WIPO Re. Application No. PCT/IB2020/059949. (10 Pages).
Official Action Dated Jan. 17, 2024 from the US Patent and Trademark Office Re. U.S. Appl. No. 17/857,085. (11 pages).
Official Action Dated Aug. 5, 2024 from the US Patent and Trademark Office Re. U.S. Appl. No. 17/857,085. (21 pages).
Cleveland Clinic "Hypertrophic Cardiomyopathy", Cleveland Clinic, Retrieved Online, pp. 1-2, 2021.
Meluzin et al. "Noninvasive Prediction of the Exercise-Induced Elevation in Left Ventricular Filling Pressure in Post-Heart Transplant Patients With Normal Left Ventricular Ejection Fraction", Clinical Cardiology, 18(2): 63-72, 2013.
Official Action Dated Oct. 11, 2024 from the US Patent and Trademark Office Re. U.S. Appl. No. 17/770,329. (26 pages).
Notice of Reasons for Rejection Dated Dec. 3, 2024 From the Japan Patent Office Re. Application No. 2022-523513 and Its Translation into English. (12 Pages).
Official Action Dated Sep. 8, 2023 from the US Patent and Trademark Office Re. U.S. Appl. No. 17/857,085. (24 pages).
Eisman et al. "Pulmonary Capillary Wedge Pressure Patterns During Exercice Predict Exercise Capacity and Incident Heart Failure", Circulation: Heart Failure, 11(5): 1-9, May 2018.
Meluzin et al. "Improvement in the Prediction of Exercise-Induced Elevation of Left Ventricular Filling Pressure in Patients With Normal Left Ventricular Ejection Fraction", Echocardiography, 34(1): 78-86, Oct. 25, 2016. Abstract.
International Preliminary Report on Patentability Dated Jul. 21, 2022 From the International Preliminary Examining Authority Re. Application No. PCT/IB2020/059944. (21 Pages).
Interview Summary Dated Mar. 21, 2025 from the US Patent and Trademark Office Re. U.S. Appl. No. 17/770,329. (8 pages).
Notification of Office Action and Search Report Dated Apr. 1, 2025 From the State Intellectual Property Office of the People's Republic

(56) References Cited

OTHER PUBLICATIONS of China Re. Application No. 202080089348.6 and Its Machine Translation of Office Action into English. (10 Pages).

Notification of Office Action and Search Report Dated Mar. 19, 2025 From the State Intellectual Property Office of the People's Republic of China Re. Application No. 202080088570.4 and its Translation of the Office Action into English. (30 Pages).

Notification of Office Action and Search report Dated Mar. 21, 2025 From the State Intellectual Property Office of the People's Republic of China Re. Application No. 202080090192.3 and Its Translation in English (18 Pages).

Notification of Office Action and Search Report Dated Mar. 26, 2025 From the State Intellectual Property Office of the People's Republic of China Re. Application No. 202080101268.8 and Its Machine Translation of Office Action into English. (26 Pages).

Communication Pursuant to Article 94(3) EPC Dated Nov. 11, 2025 From the European Patent Office Re. Application No. 20803265.6 (4 Pages).

Notification of Office Action and Search Report Dated Nov. 6, 2025 From the State Intellectual Property Office of the People's Republic of China Re. Application No. 202080088570.4 and its Machine Translation of the Office Action into English. (37 Pages).

\* cited by examiner

METHODS FOR PLANNING AND DELIVERING CARDIAC ELECTRICAL STIMULATION

RELATED APPLICATIONS

This application is a National Phase of PCT Patent Application No. PCT/IB2020/059947 having International filing date of Oct. 22, 2020, which claims the benefit of priority under 35 USC § 119 (e)_of U.S. Provisional Patent Application Nos. 63/042,061 filed on Jun. 22, 2020, 62/924,776 filed on Oct. 23, 2019, 63/001,343 filed on Mar. 29, 2020, and 62/924,782 filed on Oct. 23, 2019.

PCT Patent Application No. PCT/IB2020/059947 is part of a co-filing of the following PCT applications, all filed on Oct. 22, 2020 and by the same applicant, Impulse Dynamics NV:

PCT Patent Application No. PCT/IB2020/059943 titled "INCREASING PEAK VO2 IN PATIENTS WITH HF USING CARDIAC CONTRACTILITY MODULATION STIMULATION";

PCT Patent Application No. PCT/IB2020/059949 titled "CARDIAC CONTRACTILITY MODULATION FOR ATRIAL ARRHYTHMIA PATIENTS"; and PCT Patent Application No. PCT/IB2020/059944 titled "CARDIAC CONTRACTILITY MODULATION IN ASSOCIATION WITH RESPIRATION".

The contents of the above applications are all incorporated by reference as if fully set forth herein in their entirety.

FIELD AND BACKGROUND OF THE INVENTION

The present invention, in some embodiments thereof, relates to planning and delivering cardiac electrical stimulation and, more particularly, but not exclusively, to cardiac electrical stimulation treatment which parameters can be updated based on and/or in response to actual cardiac activity.

SUMMARY OF THE INVENTION

According to an aspect of some embodiments there is provided a method for cardiac electrical stimulation, comprising: defining a treatment plan including parameters according to which cardiac electrical stimulations are applied to the heart; applying cardiac electrical stimulations to the heart according to the treatment plan; during applying, adapting the treatment to actual cardiac activity; and automatically updating at least one of the parameters to compensate for any changes made relative to the treatment plan due to the adapting.

In some embodiments, the parameters include one or more of: a rate of cardiac electrical stimulations; a time period over which cardiac electrical stimulations are to be applied; stimulation current; an output voltage; a duration of each stimulation.

In some embodiments, defining a treatment plan comprises selecting the parameters so as to deliver one or both of: a total number of cardiac electrical stimulations; a total amount of cardiac electrical stimulation energy.

In some embodiments, automatically updating comprises one or more of: increasing or reducing the rate of cardiac electrical stimulations; lengthening or shortening the time period over which cardiac electrical stimulations are applied; increasing or reducing the stimulation current intensity; lengthening or shortening the stimulation duration.

In some embodiments, defining a treatment plan comprises measuring or receiving input of cardiac activity characteristics of a patient being treated.

In some embodiments, the cardiac activity characteristics include: average heart rate, average stroke volume, occurrence rate of irregular cardiac events.

In some embodiments, the irregular cardiac events are from the group of: premature ventricular contraction (PVC), atrial arrhythmia or ventricle arrhythmia.

In some embodiments, applying comprises delivering an electrical stimulation via an implanted device comprising one or more leads which contact the ventricular septum of the heart.

In some embodiments, the method comprises measuring the actual cardiac activity using one or more sensors.

In some embodiments, defining a treatment plan comprises setting one or more thresholds of a heart rate during which the cardiac electrical stimulations are to be applied.

In some embodiments, defining a treatment plan comprises selecting one or more physical states of the patient during which the cardiac electrical stimulations are to be applied.

In some embodiments, automatically updating is performed in response to one or more skipped stimulations.

In some embodiments, automatically updating is performed if a number of cardiac electrical stimulations that were actually delivered is lower than a planned number of cardiac electrical stimulations.

In some embodiments, automatically updating is performed if a total amount of cardiac electrical stimulation energy delivered is lower than a planned amount of cardiac electrical stimulation energy.

In some embodiments, the cardiac electrical stimulation comprises cardiac contractility modulation stimulation.

According to an aspect of some embodiments there is provided a method for delivering a therapeutic stimulation to the heart, comprising: selecting a total number of stimulations to be delivered to the heart over a selected period of time; delivering stimulations to the heart; counting the number of stimulations actually delivered; if the number of stimulations actually delivered is lower than the selected total number of stimulations, adding a selected time period at an extent sufficient to deliver the required additional stimulations.

In some embodiments, the stimulations comprise cardiac contractility modulation stimulations.

In some embodiments, the method comprises adding the selected time period to deliver additional stimulations if the number of stimulations actually delivered is lower than 90% of the selected total number of stimulations.

In some embodiments, adding a selected time period comprises extending the period of time that was initially selected.

In some embodiments, if the number of stimulations actually delivered is lower than the selected total number of cardiac contractility modulation stimulations, reducing the selected total number of cardiac contractility modulation stimulations for a future stimulation session.

In some embodiments, the selected time period is between 4 hours-8 hours a day.

According to an aspect of some embodiments there is provided a method for planning cardiac electrical stimulation treatment, comprising: selecting a total amount of energy to be delivered by cardiac electrical stimulations to the heart; and selecting one or both of: a time period during which cardiac electrical stimulations are to be applied to the heart, and stimulation current intensity for each of the stimulations, the time period and the stimulation current intensity selected so as to reach the total amount of energy.

In some embodiments, the cardiac electrical stimulation comprises cardiac contractility modulation stimulation.

According to an aspect of some embodiments there is provided a system for cardiac electrical stimulation treatment, comprising: an implantable pulse generator; one or more leads extending from the pulse generator to the heart for applying cardiac electrical stimulation; a controller programmed with at least one treatment plan for applying cardiac electrical stimulations, the controller configured to automatically update the treatment plan in response to actual cardiac activity by updating one or more of: a time period during which cardiac electrical stimulations are applied; a rate of cardiac electrical stimulations; an amount of energy delivered at each cardiac electrical stimulation.

In some embodiments, the system comprises one or more sensors including an ECG sensor configured for measuring the actual cardiac activity.

In some embodiments, one or more leads contact the ventricular septum of the heart.

In some embodiments, the controller is programmed with instructions for automatically updating the treatment plan, the instructions suitable to compensate for real time changes in the treatment plan.

In some embodiments, the instructions include numerical factors according to which one or more of the following parameters are updated: stimulation current intensity; output voltage which sets a selected stimulation current intensity; stimulation duration; treatment session duration; stimulation rate.

According to an aspect of some embodiments there is provided a method of operating a cardiac electrical stimulation device, the device comprising a memory in which an initial treatment plan is defined, the treatment plan including parameters according to which cardiac electrical stimulations are applied to the heart; the method comprising: generating, via a device controller and according to the initial treatment plan, commands for electrifying one or more leads of the device with a cardiac electrical stimulation signal;
sensing actual cardiac activity using one or more sensors;
changing the commands to adapt the treatment to the actual cardiac activity as sensed by the one or more sensors; and
automatically updating, at the device controller, at least one of the parameters to compensate for changes made relative to the initial treatment plan due to the sensed actual cardiac activity.

In some embodiments, the parameters include one or more of: a rate of cardiac electrical stimulations; a time period over which cardiac electrical stimulations are to be applied; stimulation current; an output voltage; a duration of each stimulation.

In some embodiments, the parameters are selected and/or updated to obtain a total number of cardiac electrical stimulations and/or a total amount of cardiac electrical stimulation energy.

In some embodiments, automatically updating comprises one or more of: increasing or reducing the rate of cardiac electrical stimulations; lengthening or shortening the time period over which cardiac electrical stimulations are applied; increasing or reducing the stimulation current intensity; lengthening or shortening the stimulation duration.

In some embodiments, the treatment plan is defined and/or updated according to measured and/or received input of cardiac activity characteristics of a patient being treated.

In some embodiments, cardiac activity characteristics include: average heart rate, average stroke volume, occurrence rate of irregular cardiac events.

In some embodiments, the irregular cardiac events are from the group of: premature ventricular contraction (PVC), atrial arrhythmia or ventricle arrhythmia.

In some embodiments, the device is an implanted device and wherein the one or more leads contact the ventricular septum of the heart.

In some embodiments, the method comprises measuring the actual cardiac activity using the one or more sensors.

In some embodiments, the treatment plan is defined according to one or more thresholds of a heart rate during which the commands are to be generated.

In some embodiments, the treatment plan is defined according to one or more physical states of the patient during which the commands are to be generated.

In some embodiments, automatically updating is performed in response to one or more skipped cardiac electrical stimulations.

In some embodiments, automatically updating is performed if a number of cardiac electrical stimulations that were actually delivered is lower than a planned number of cardiac electrical stimulations.

In some embodiments, automatically updating is performed if a total amount of cardiac electrical stimulation energy delivered is lower than a planned amount of cardiac electrical stimulation energy.

In some embodiments, the cardiac electrical stimulation comprises cardiac contractility modulation stimulation.

According to an aspect of some embodiments there is provided a method of operating a cardiac stimulation device, comprising:
selecting a total number of stimulations to be delivered to the heart over a selected period of time;
generating commands to deliver stimulations to the heart;
counting the number of stimulations generated;
if the number of stimulations generated is lower than the selected total number of stimulations, adding a selected time period at an extent sufficient to deliver the required additional stimulations.

In some embodiments, the stimulations comprise cardiac contractility modulation stimulations.

In some embodiments, the method comprises adding the selected time period to generate additional stimulations if the number of stimulations generated is lower than 90% of the selected total number of stimulations.

In some embodiments, adding a selected time period comprises extending the period of time that was initially selected.

In some embodiments, the method comprises, if the number of stimulations generated is lower than the selected total number of cardiac electrical stimulations, reducing the selected total number of cardiac electrical stimulations for a future stimulation session.

In some embodiments, the selected time period is between 4 hours-8 hours a day.

According to an aspect of some embodiments there is provided a method for planning cardiac electrical stimulation treatment, comprising:
selecting a total amount of energy to be delivered by cardiac electrical stimulations to the heart; and
selecting one or both of: a time period during which cardiac electrical stimulations are to be applied to the heart, and stimulation current intensity for each of the stimulations, the time period and the stimulation current intensity selected so as to reach the total amount of energy.

In some embodiments, the cardiac electrical stimulation comprises cardiac contractility modulation stimulation.

According to an aspect of some embodiments there is provided a system for cardiac electrical stimulation treatment, comprising:

an implantable pulse generator;

one or more leads extending from the pulse generator to the heart for applying cardiac electrical stimulation;

a controller programmed with at least one treatment plan for applying cardiac electrical stimulations, the controller configured to automatically update the treatment plan in response to actual cardiac activity by updating one or more parameters including: a time period during which cardiac electrical stimulations are applied; a rate of cardiac electrical stimulations; an amount of energy delivered at each cardiac electrical stimulation.

In some embodiments, the system comprises one or more sensors including an ECG sensor configured for measuring the actual cardiac activity.

In some embodiments, the one or more leads contact the ventricular septum of the heart.

In some embodiments, the controller is programmed with instructions for automatically updating the treatment plan, the instructions suitable to compensate for real time changes in the treatment plan.

In some embodiments, the instructions include numerical factors according to which one or more of the following parameters are updated: stimulation current intensity; output voltage which sets a selected stimulation current intensity; stimulation duration; treatment session duration; stimulation rate.

In some embodiments, the controller is configured to select and/or update parameters to obtain a total number of cardiac electrical stimulations and/or a total amount of cardiac stimulation energy.

In some embodiments, the controller is configured for: increasing or reducing the rate of cardiac electrical stimulations; lengthening or shortening the time period over which cardiac electrical stimulations are applied; increasing or reducing stimulation current intensity; lengthening or shortening a stimulation duration.

In some embodiments, the controller is configured to deduce one or more of: an average heart rate, an average stroke volume, an occurrence rate of irregular cardiac events based on data acquired by the one or more sensors.

In some embodiments, the irregular cardiac events are from the group of: premature ventricular contraction (PVC), atrial arrhythmia or ventricle arrhythmia.

In some embodiments, the controller is configured to set and/or receive as input one or more thresholds of a heart rate during which the cardiac electrical stimulations are applied.

In some embodiments, the controller is configured to set and/or receive as input one or more physical states of the patient during which the cardiac electrical stimulations are applied.

In some embodiments, the controller is configured to automatically update the treatment plan in response to one or more skipped cardiac electrical stimulations.

In some embodiments, the controller is configured to automatically update the treatment plan if a number of cardiac electrical stimulations that were actually delivered is lower than a planned number of cardiac electrical stimulations.

In some embodiments, the controller is configured to set a number of cardiac electrical stimulations to be delivered within a set time period.

In some embodiments, the set time period comprises 24 hours.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2A:
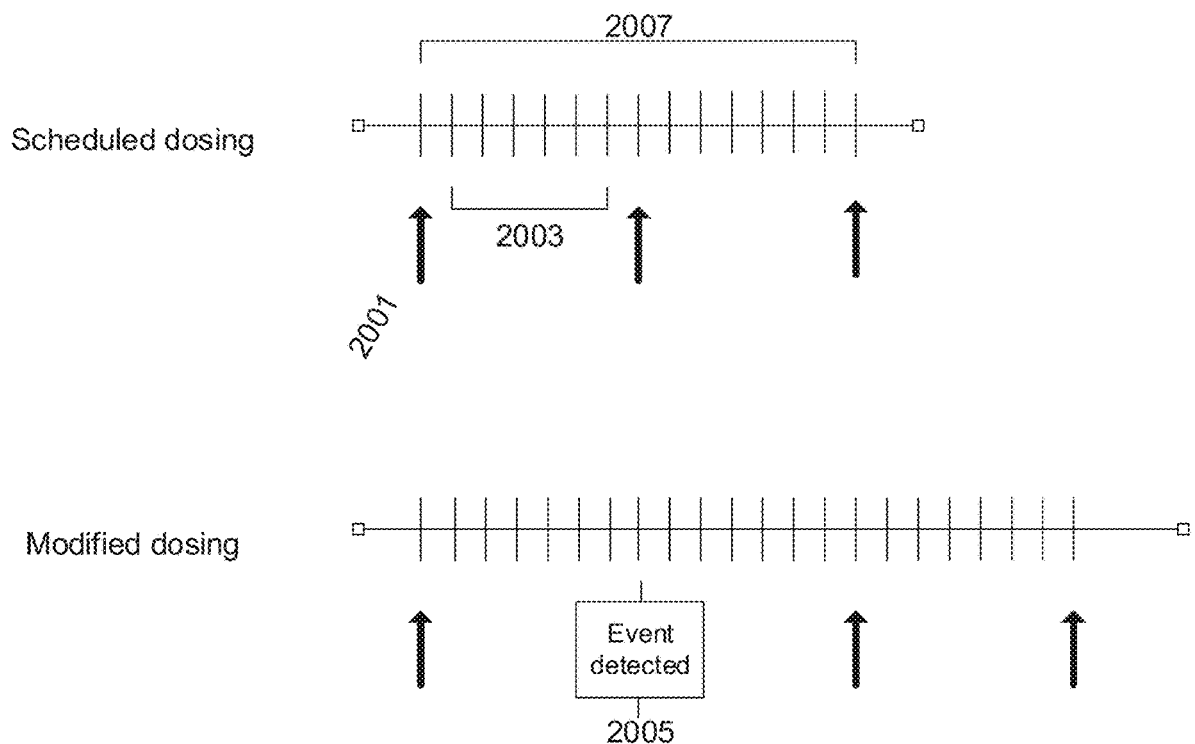
Figure 2B:
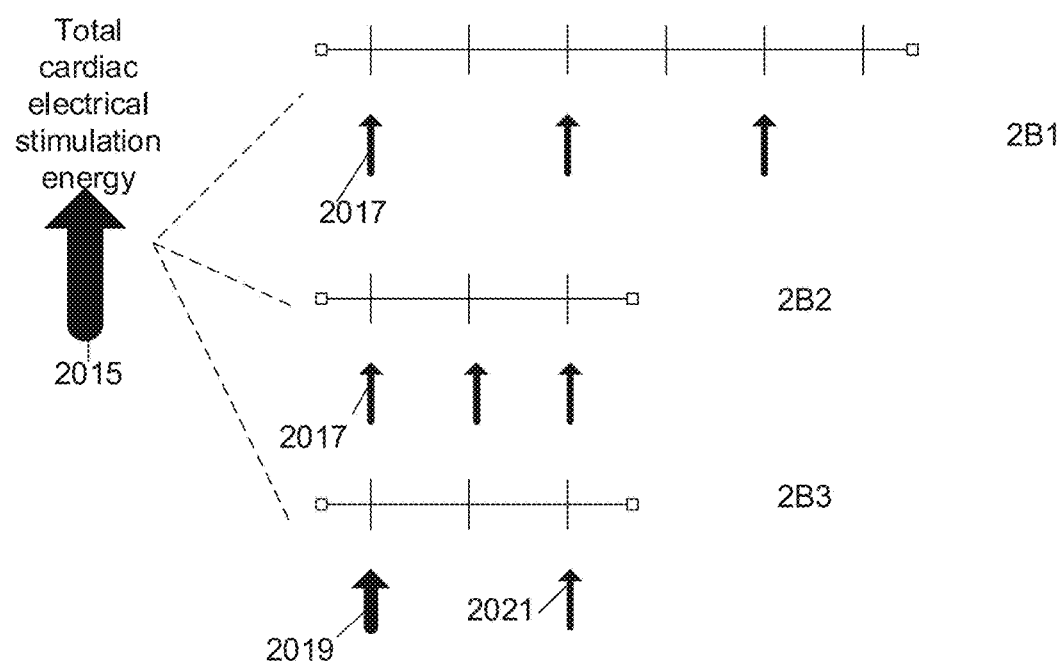
Figure 3:
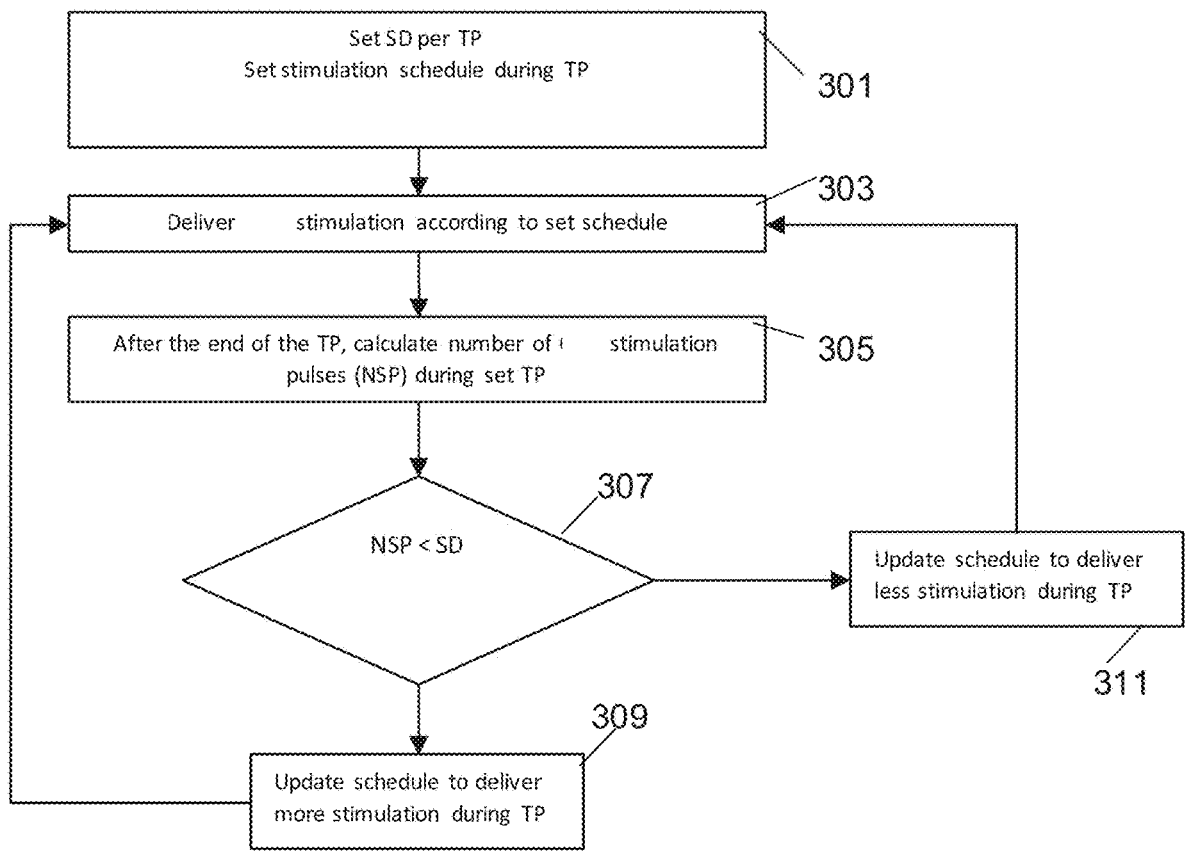
Figure 4A:
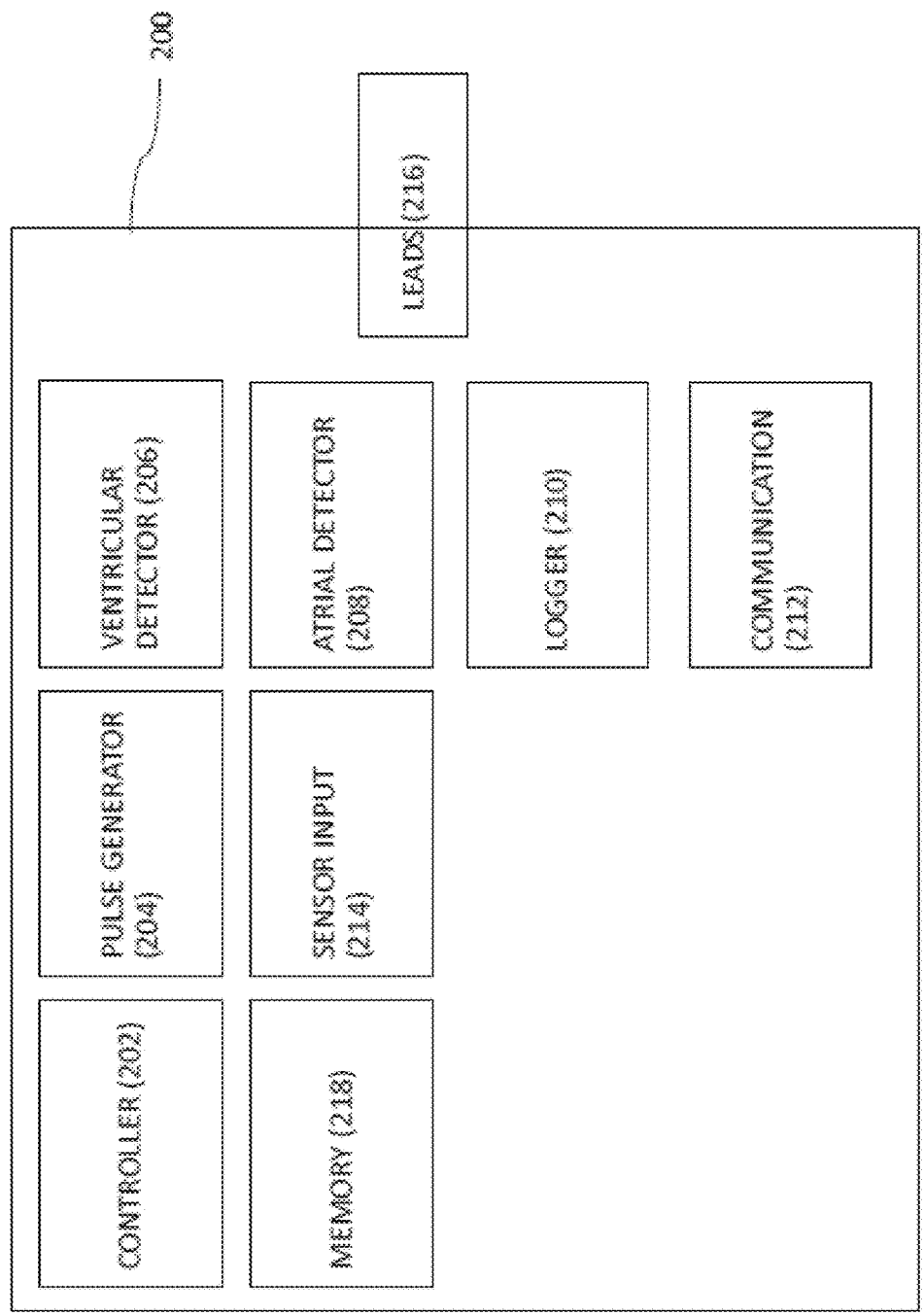
Figure 4B:
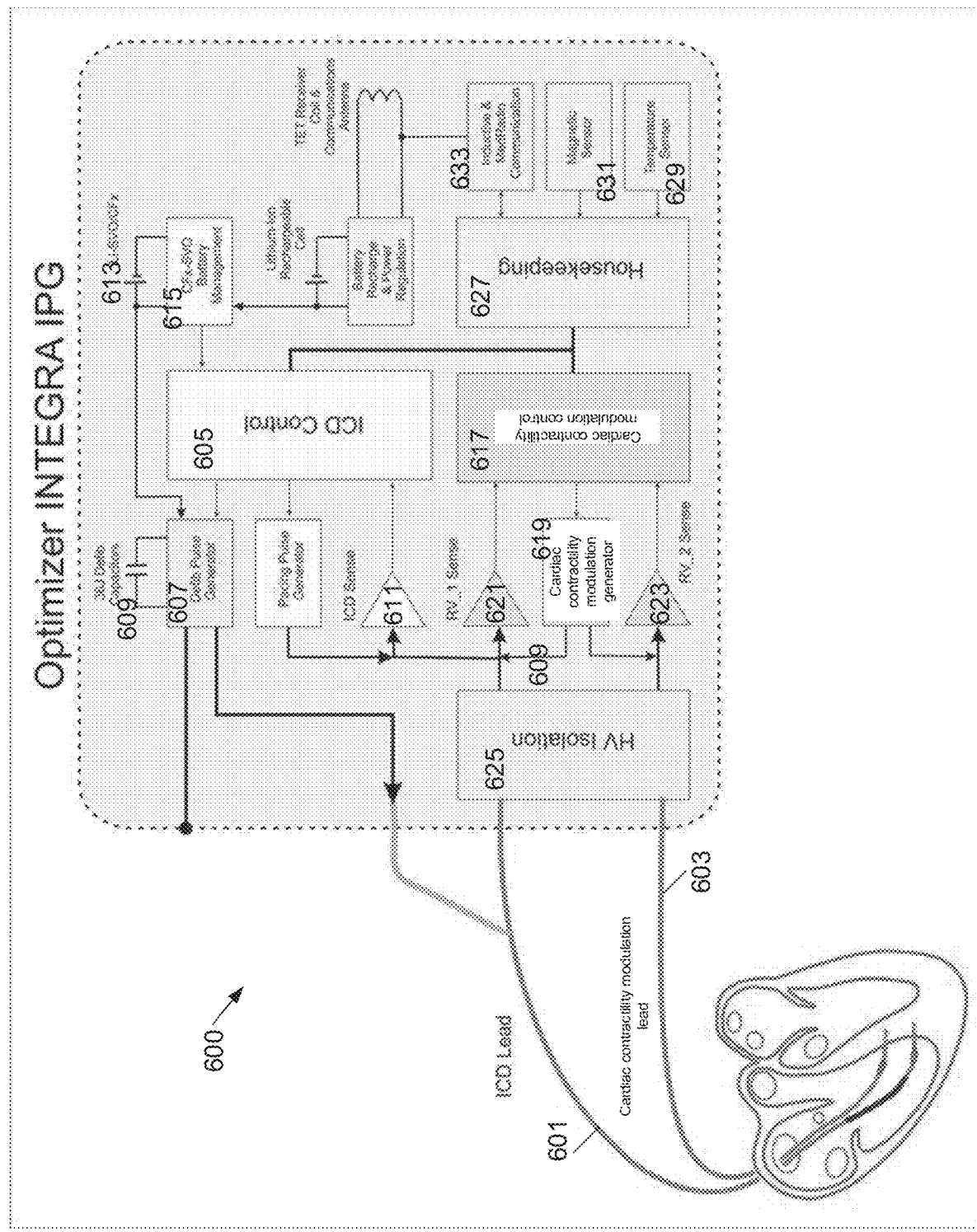
Figure 5A:
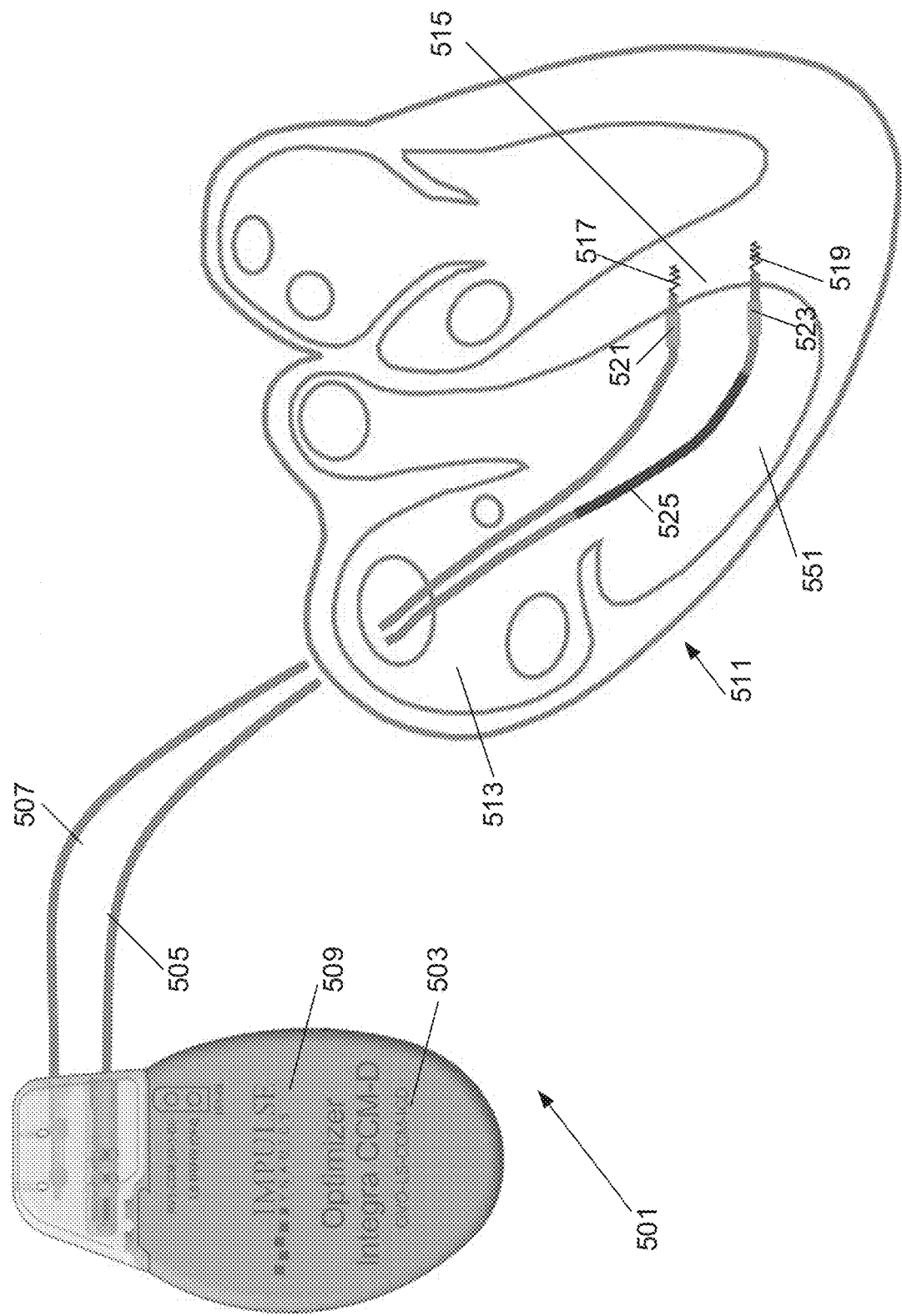
Figure 5B:
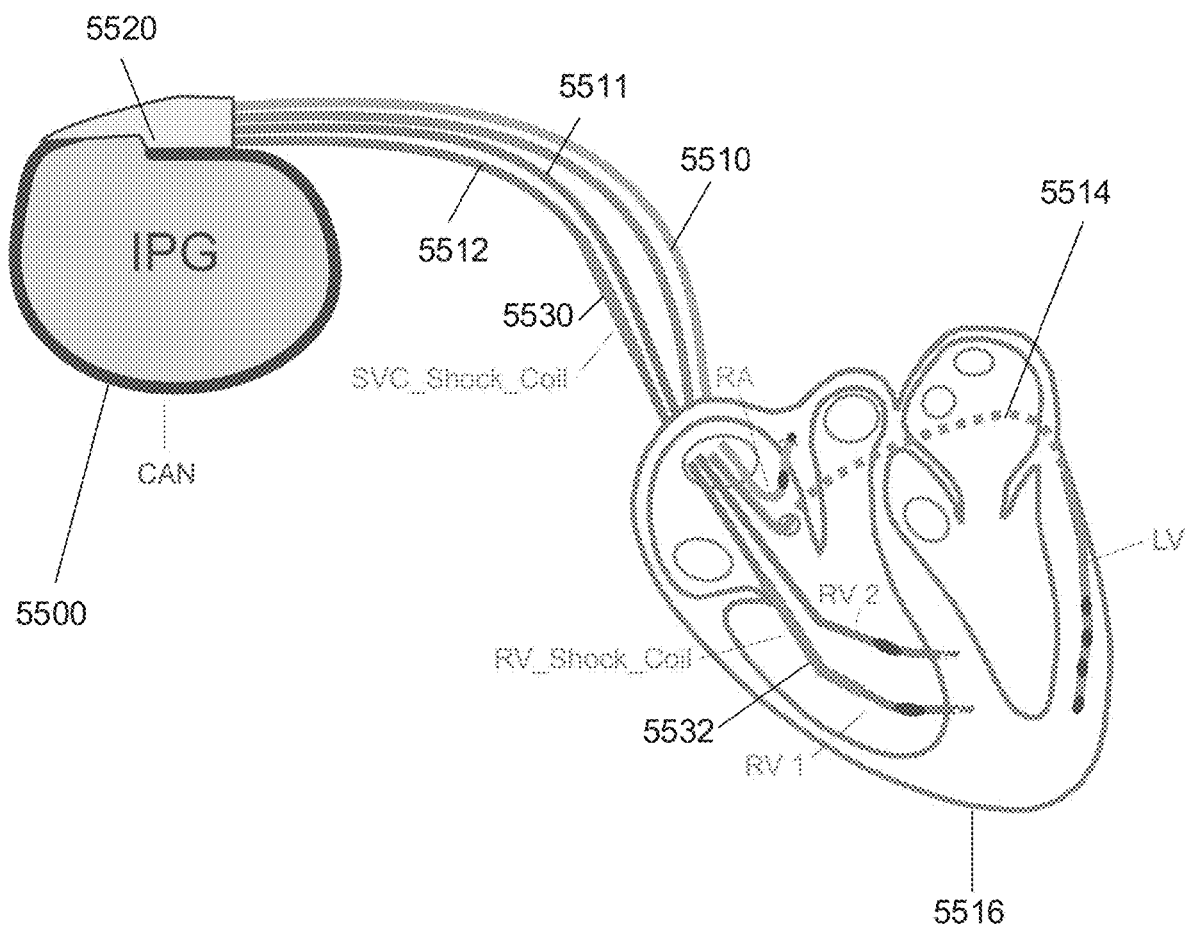

FIG. 2A schematically shows scheduled cardiac electrical stimulation dosing and modified cardiac electrical stimulation dosing which compensates for changes in the scheduled dosing due to actual cardiac activity, according to some embodiments;

FIG. 2B schematically shows optional cardiac electrical stimulation treatments set in accordance with a total amount of stimulation energy to be delivered, according to some embodiments;

FIG. 3 is a flowchart of a method for setting and/or modifying cardiac electrical stimulation treatment dosing, according to some embodiments;

FIGS. 4A-B are block diagrams of exemplary systems for cardiac electrical stimulation treatment, according to some embodiments;

FIGS. 5A-B schematically illustrate exemplary implantable cardiac devices for cardiac electrical stimulation treatment, according to some embodiments.

DESCRIPTION OF SPECIFIC EMBODIMENTS OF THE INVENTION

The present invention, in some embodiments thereof, relates to planning and delivering cardiac electrical stimulation treatment and, more particularly, but not exclusively, to cardiac electrical stimulation treatment which parameters can be updated based on and/or in response to actual cardiac activity.

A broad aspect of some embodiments relates to stimulation treatment which is planned according to characteristics of cardiac activity and is optionally modified in view of actual cardiac activity. In some embodiments, stimulation is selected and/or performed taking into account a natural variability in the function of the heart, including both intra-person and inter-person variability.

An aspect of some embodiments relates to updating one or more parameters of cardiac electrical stimulation treatment, optionally in real time, to compensate for any changes made in the treatment due to actual cardiac activity.

In some embodiments, a treatment plan is defined by setting parameters such as: stimulation rate, stimulation current intensity, a duration of a treatment session, and/or other parameters. In some embodiments, the parameters are selected according to a general treatment goal, for example, a total number of cardiac electrical stimulations to be delivered to the heart, and/or a total amount of cardiac electrical stimulation energy to be delivered to the heart.

In some embodiments, the treatment plan is defined according to characteristics of cardiac activity of the patient being treated. For example, taking into account characteristics such as the patient's heart rate, stroke volume, occurrence rate of irregular cardiac events (such as arrhythmia), and/or other characteristics.

In some embodiments, the treatment plan defines one or more conditions for applying the cardiac electrical stimulation. For example, the plan defines that stimulation should be delivered only when the heart rate is lower and/or higher than a threshold (or within a selected range). For example, the plan defines that stimulation should be delivered only in certain physical states of the patient, such as only during rest.

In some embodiments, the treatment plan takes into account expected variability in cardiac activity. In some embodiments, treatment parameters such as the total number of stimulations to be delivered; the total amount of stimulation energy to be delivered; the rate of stimulating; the timing of stimulation are selected taking into account that a change in a parameter may have an effect that is non-linear on the treatment itself. Therefore, in some embodiments, multiple sets of parameters may be defined for obtaining equivalent treatment effects. For example, it may be that delivery of 8000 stimulations randomly dispersed over a day would obtain a treatment effect which is equivalent to stimulations delivered at each cardiac beat for one hour at a heart rate higher than 90 bpm. In some embodiments, systems and/or devices for example as described herein (e.g. the system controller) are preprogrammed with a look-up table including parameter sets, which optionally lead to equivalent treatment effects and may be interchanged. In some embodiments, a treatment parameter is selected and/or calculated according to one more additional treatment parameters and/or according to a desired treatment effect.

In some embodiments, cardiac electrical stimulation treatment is delivered according to the plan, but variations may be made in the plan in response to actual cardiac activity. Optionally, variations are made in real time. For example, if an irregular beat is identified, stimulation at that beat may be skipped. In some embodiments, variations in the treatment plan are made in response to actual cardiac activity measured (and optionally monitored over time) by one or more sensors, such as via ECG measurement.

In some embodiments, the variations made in the plan are compensated for, for example so as to reach the general treatment goal. In some embodiments, compensating comprises updating one or more treatment parameters, such as: updating a duration of a treatment session; updating the rate of cardiac electrical stimulations; updating the current intensity of the stimulations; updating the number of electrodes being activated (for example so as to contact a different sized area of tissue); updating the time interval and/or number of beats between consecutive stimulations; and/or other treatment parameters.

In some embodiments, an implantable device is provided, including one or more leads for delivering the cardiac electrical stimulation and a controller configured for controlling stimulation via the leads. In some embodiments, the controller is configured for automatically updating one or more treatment parameters in response to a variation made in the treatment plan due to actual cardiac activity. In some embodiments, the controller is programmed with one or more treatment plans and one or more "fallback" instructions for updating the treatment parameters when treatment is being carried out and is optionally changed due to actual cardiac activity.

Some examples of "fallback" instructions include: lengthening a treatment session duration if the number of stimulations actually delivered is smaller than a set number of stimulations; increasing an intensity of the stimulation current if the total amount of energy delivered is lower than a set amount of energy to be delivered; increasing the rate of cardiac electrical stimulations if a treatment session time period has almost ended but not enough stimulations were actually delivered; updating a heart rate threshold for applying of stimulations if the actual heart rate over the treatment session (or a part of it) was not within the defined heart rate for delivery of stimulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Before explaining at least one embodiment of the invention in detail, it is to be understood that the invention is not necessarily limited in its application to the details set forth in the following description or exemplified by the Examples.

The invention is capable of other embodiments or of being practiced or carried out in various ways.

Methods of Planning and/or Modifying Cardiac Electrical Stimulation Treatment

Figure 1A:
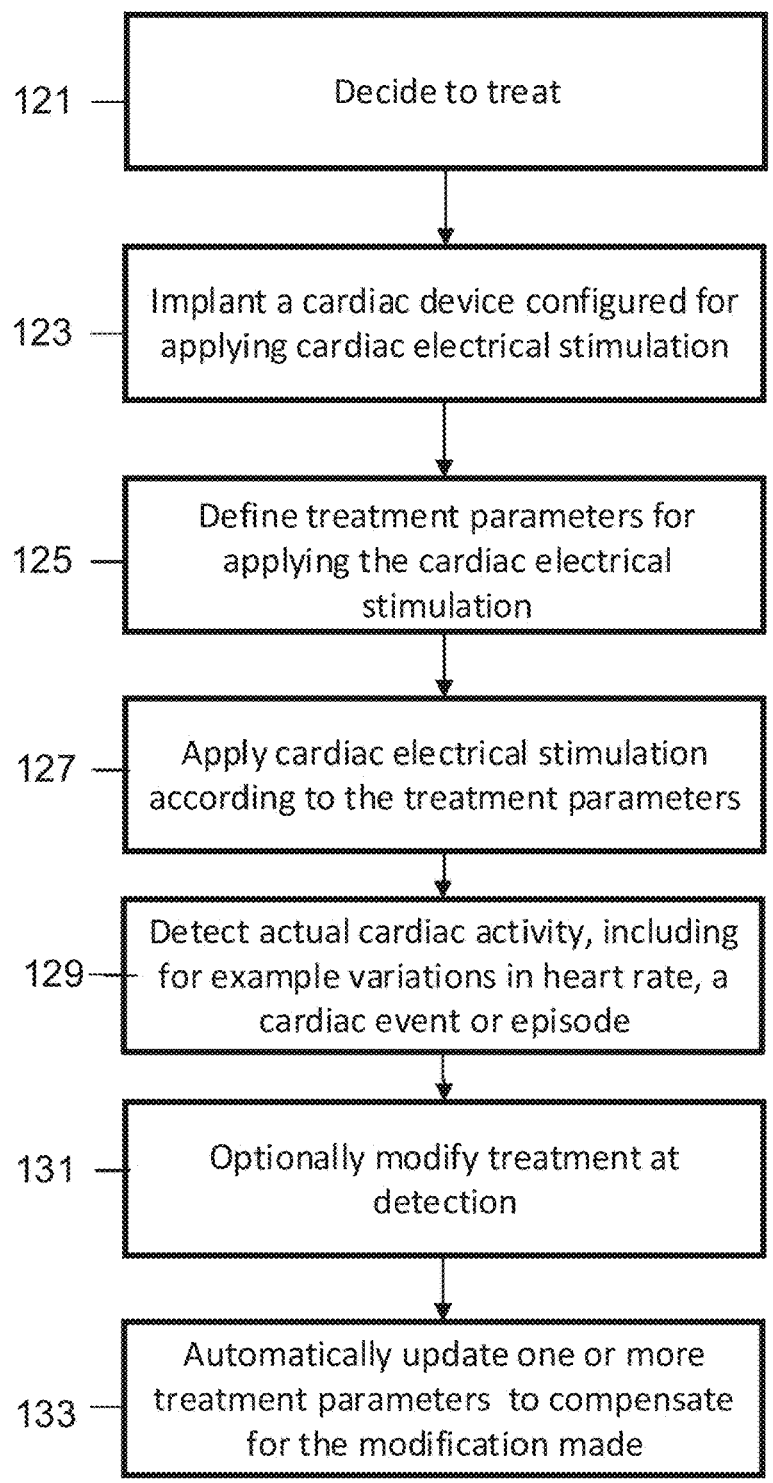
FIG. 1A is a flowchart of a method for cardiac electrical stimulation treatment in which real time changes in scheduled treatment are compensated for, according to some embodiments.

Referring now to the drawings, FIG. 1A is a flowchart of a method for cardiac electrical stimulation treatment in which real time changes in scheduled treatment are compensated for, according to some embodiments.

In some embodiments, a decision is made to treat a patient by applying of cardiac electrical stimulation to the heart (121).

In some embodiments, the stimulation signal is a cardiac contractility modulation signal. In some embodiments, the cardiac contractility modulation signal is a non-excitatory signal applied to the heart, optionally during a relative and/or absolute refractory period of the cardiac cycle. In some embodiments, the signal is selected to increase the contractility of a cardiac ventricle when the electric field of the signal stimulates such ventricular tissue, for example, the left ventricle, the right ventricle and/or a ventricular septum. In some embodiments, contractility modulation is provided by phosphorylation of phospholamban caused by the signal. In some embodiments, contractility modulation is caused by a change in protein transcription and/or mRNA creation caused by the signal, optionally in the form of reversal of a fetal gene program.

It is noted that in some embodiments the cardiac contractility modulation signal may be excitatory to tissue other than that to which it is applied. Various mechanisms by which cardiac contractility modulation signals may operate are described, for example in "Cardiac contractility modulation: mechanisms of action in heart failure with reduced ejection fraction and beyond" by C. Tschope et al, European Journal of Heart Failure (2018), doi:10.1002/ejhf.1349 and may serve to guide in selecting signal application parameters in order to utilize and/or comply with one or more of these mechanisms.

The term "cardiac electrical stimulation" is used herein, unless otherwise noted, as a general placeholder for all such signals. In some embodiments, the term "cardiac electrical stimulation" is meant to cover an electroceutical, for example, a therapeutic signal. In some embodiments, stimulation is delivered to the heart and/or to associated organs or tissue. In some embodiments, the stimulation affects neural activity. In some embodiments, stimulation is delivered according to a defined dose. Optionally, stimulation is applied in synchrony with cardiac activity, e.g. in synchrony with heart beat.

In some embodiments, the cardiac electrical stimulation is applied according to parameters (e.g. current intensity, timing, rate, anatomical location of applying) suitable to cause cardiac contractility modulation. In some embodiments, the cardiac electrical stimulation comprises stimulation of the cardiac fat pad. In some embodiments, the cardiac electrical stimulation comprises affecting the heart via vagal nerve stimulation. In some embodiments, the cardiac electrical stimulation comprises stimulation of cardiac blood vessels innervation, e.g. stimulation of the aorta, vena cava, pulmonary artery, pulmonary vein.

In some embodiments, a patient selected for treatment is a patient suffering from heart failure, congestive heart failure, and/or like symptoms. In some embodiments, a patient selected for treatment is a patient in which the heart pumping action is impaired, potentially affecting blood flow and/or oxygen supply. In some embodiments, a patient selected for treatment is a patient whose cardiac output and/or cardiac contractility are impaired, and may be improved by applying of cardiac electrical stimulation therapy, for example, by applying cardiac contractility modulation therapy. In some cases, one or more effects of the cardiac electrical stimulation treatment, such as an increase in cardiac contractility, a higher peak oxygen uptake, may improve breathing.

In some embodiments, a cardiac device configured for applying cardiac electrical stimulation is implanted in the patient (123). In some embodiments, the device comprises a pulse generator which is optionally implanted outside the heart, for example in the subclavian area, and one or more leads for stimulating the heart. Optionally, one or more leads contact the ventricular septum of the heart.

In some embodiments, treatment parameters for applying the cardiac electrical stimulation are defined (125). In some embodiments, treatment parameters are selected and the cardiac device is programmed accordingly (e.g. the device controller).

In some embodiments, parameters of the cardiac electrical treatment include, for example: timing of stimulation (e.g. relative to the cardiac cycle and/or relative to previously applied stimulation), number of stimulations (e.g. a total number of stimulations to be applied, optionally within a defined time period), stimulation current intensity, stimulation duration, safety thresholds, stimulation rate, and/or other parameters.

In some embodiments, general treatment parameters (which may also be referred to as "treatment goals") are set, including, for example: a total amount of stimulation energy (electric power) to be delivered to the patient (optionally over or within a defined time period, such as a minute, hour, day, week, month); a total number of cardiac electrical stimulations to be delivered to the patient (optionally over or within a defined time period, such as a minute, hour, day, week, month); an accumulated duration of stimulation pulses (optionally over or within a defined time period, such as a minute, hour, day, week, month).

In some embodiments, treatment parameters are selected by clinical personnel, such as the caring physician (e.g. cardiologist). Additionally or alternatively, treatment parameters are automatically selected, e.g. by the device controller, for example based on inputted patient data.

In some embodiments, the patient data includes general patient information such as age, sex, medical condition. In some embodiments, for example as further described herein, the patient data includes known and/or estimated statistics of the patient's cardiac activity, including, but not limited to: heart rate (e.g. average, peak values); actual occurrence rate and/or expected likelihood of cardiac events, such as premature ventricular contraction (PVC), atrial arrhythmia and/or ventricle arrhythmia; stroke volume (e.g. average stroke volume); ejection fraction, cardiac output, intra cardiac pressure, intra cardiac pressure gradient measured over time, NYHA class score, peak VO2, 6 minute walk score, and/or other statistics.

In some embodiments, cardiac electrical stimulation is applied according to the selected treatment parameters (127).

In some embodiments, actual cardiac activity is detected, including, for example, variations in heart rate (for example relative to an expected average heart rate), a cardiac event or episode, a change in stroke volume, and/or other (129). In some embodiments, actual cardiac activity is sampled and/or continuously monitored. Optionally, one or more sensors are used for tracking the actual cardiac activity. In an example, ECG measurement is performed, optionally via an intra-cardiac electrode. Optionally, an intra-cardiac electrode used for ECG measurement is the same electrode which applies the cardiac electrical stimulation. Optionally, an intra-cardiac sensor such as a bio impedance sensor and/or a pressure sensor are used for measuring cardiac performance parameters such as ejection fraction, cardiac output, intra cardiac pressure, intra cardiac pressure gradient over time.

Optionally, upon detection of cardiac activity, for example upon detection of a change from expected cardiac activity and/or irregularity, cardiac electrical stimulation treatment is modified (131). In an example, a scheduled cardiac electrical stimulation (i.e. a single stimulation) is not delivered when detecting an irregular cardiac beat (e.g. premature ventricular contraction (PVC), atrial arrhythmia and/or ventricle arrhythmia). In another example, a scheduled cardiac electrical stimulation is not delivered when a defibrillation signal is delivered to the heart, (optionally via the same device delivering the cardiac electrical stimulation signal). Optionally, in such situation, cardiac electrical stimulation is not delivered during a defined time period which immediately follows the defibrillation, for allowing the heart to recover from the defibrillation.

In some embodiments, treatment is modified in response to a change in heart rate. For example, treatment is modified when sensing a heart rate which is higher or lower than an average rate expected for the specific patient. For example, treatment is modified when the heart rate is 100%, 120%, 150%, 170% or intermediate, higher or lower percentage of the expected average heart rate. For example, treatment is modified when the heart rate is only 70%, 50%, 30% or intermediate, higher or lower percentage of the expected average heart rate.

In some embodiments, one or more treatment parameters are automatically updated to compensate for the modification made (133). Any of the above mentioned treatment parameters may be modified, or a combination thereof.

In some embodiments, treatment is updated in real time, for example during a stimulation session, for example during a daily stimulation session consisting of several hours (e.g. 1, 2, 3, 4, 5, 6 hours or intermediate longer or shorter time period) over which stimulation is provided by the device. In some embodiments, treatment is updated in response to detection of the irregular cardiac event. Additionally or alternatively, treatment is updated based on the action taken by the device in response to that event (for example, a skipped stimulation).

Following are examples of compensations made in response to a modification in treatment that may be performed due to actual cardiac activity:

In some embodiments, according to a planned treatment, cardiac electrical stimulation is synchronized to be delivered at each cardiac cycle. For example, a cardiac contractility modulation signal is applied during the refractory period. Under such scheduling, a patient whose actual heart rate (i.e. the heart rate during at least a part of a treatment session) is higher than an expected average may receive an excess number of stimulations, and a patient whose heart rate is lower than an expected average may receive fewer stimulations than planned. In some embodiments, to compensate for the variation, parameters such as the treatment session duration or the stimulation current intensity may be updated. For example, for the patient with the higher heart rate: the treatment session duration may be shortened, thereby reducing or avoiding excess stimulations; the stimulation current intensity may be reduced, so that a total amount of energy delivered over a treatment session remains as planned. For example, for the patient with the lower heart rate: the treatment session duration may be lengthened in attempt to reach the planned amount of stimulations; the stimulation current intensity may be increased, so that a total amount of energy delivered over a treatment session reaches the planned amount. In some embodiments, stimulation current intensity is set by controlling (optionally, modulating) a voltage set by the device. In some embodiments, current intensity (or amplitude) is set by setting output voltage under the assumption that electrical impedance of device components (such as the one or more stimulation leads) remains substantially constant, and does not change. In some embodiments, an amplitude of the output voltage is controlled to result in a selected stimulation current.

In some embodiments, when a stimulation is skipped or cancelled, such as in response to an irregular cardiac beat, compensation may include: increasing a duration of the treatment session so as to deliver additional stimulation(s); increasing current intensity in one or more subsequent stimulations so as to compensate for the amount of energy that was not delivered; increasing the size (e.g. surface area) of tissue being contacted by the device electrodes and stimulated. In some cases, a cardiac electrical stimulation is not applied at a heartbeat when the heartbeat is deemed unsafe in the sense that a cardiac electrical stimulation signal might cause an arrhythmia if applied during that beat. Optionally or additionally, the heart may be allowed to "recover" from an arrhythmic beat for one or more "prohibition" beats. In some embodiments, compensation for a stimulation that was not applied intentionally may include: increasing a duration of the treatment session so as to deliver additional stimulation(s); increasing current intensity in one or more subsequent stimulations so as to compensate for the amount of energy that was not delivered; increasing the size (e.g. surface area) of tissue being contacted by the device electrodes and stimulated; and/or other change in treatment parameters.

Figure 1B:
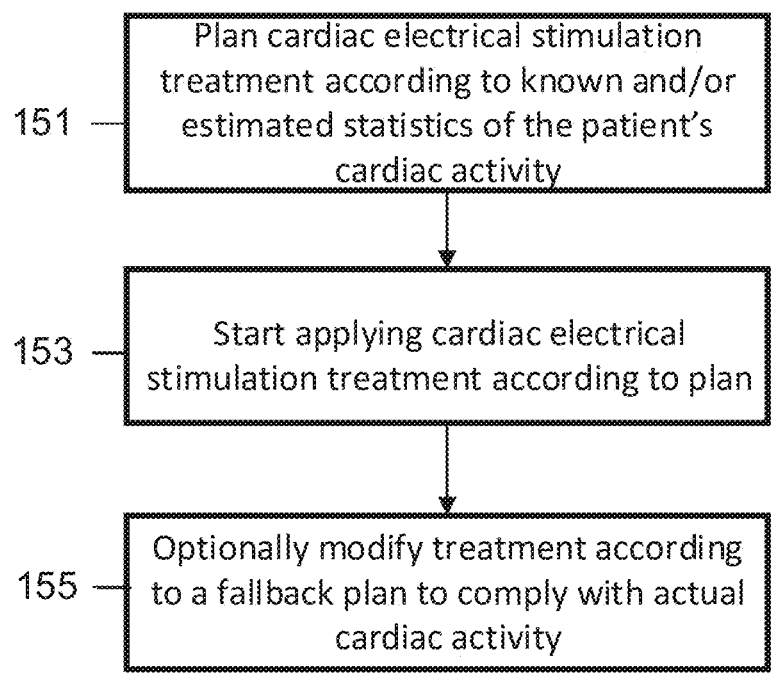
FIG. 1B is a flowchart of a method for planning cardiac electrical stimulation treatment and optionally modifying treatment in accordance with actual cardiac activity, according to some embodiments.

FIG. 1B is a flowchart of a method for planning cardiac electrical stimulation treatment and optionally modifying treatment in accordance with actual cardiac activity, according to some embodiments.

In some embodiments, cardiac electrical stimulation treatment is planned according to known and/or estimated statistics of the patient's cardiac activity (151).

In some embodiments, general treatment parameters (or goals) are defined, including, for example: a total number of stimulations to be delivered; a total amount of energy to be applied via the stimulation(s); a total number of stimulations to be delivered within a certain time window (e.g. within a 1 hour window, a 12 hour window, a 24 window, or intermediate, longer or shorter time windows); a total duration of stimulation pulses to be delivered within a certain time window (e.g. within a 1 hour window, a 12 hour window, a 24 window, or intermediate, longer or shorter time windows). In an example, the total number of stimulations is set for between 5000-50000 stimulations per day, such as 5500, 20000, 40000 or intermediate, higher or smaller amount of stimulations per day. In an example, a rate of stimulation set for between 200-3000 stimulations per hour, such as 300, 1000, 2500 or intermediate, higher or lower rate of stimulations per hour.

In some embodiments, to achieve the general goals, cardiac electrical stimulation treatment is planned taking into account the patient's known and/or expected cardiac activity, for example according to patient's statistics such as: heart rate (e.g. average, peak and/or base); stroke volume;

likelihood of cardiac events (such as premature ventricular contraction (PVC), atrial arrhythmia or ventricle arrhythmia); a likelihood of the need of defibrillation, and/or other statistics.

In some embodiments, the plan defines dosages. A dosage may include, for example, a time period (e.g. within a 24 hour window) over which stimulation is applied. For example, the plan defines that cardiac electrical stimulation will be delivered over 1, 2, 3, 5, 6, 8 hours or intermediate, longer or shorter time period each day. Optionally, stimulation is delivered intermittently (e.g. with a non-stimulation time period between stimulation time periods, such as 1 hour stimulation; 2 hour break; 1 hour stimulation, etc.). In some embodiments, stimulation is applied over a time period of 5 hours, 6 hours, 7 hours or intermediate, longer or shorter time periods per each day. Optionally, during the defined time period, a target number and/or percentage of cardiac electrical stimulations is set, for example, so that stimulation will be applied at each cardiac beat for over at least 60%, 70%, 80% or intermediate, higher or smaller percentage over the defined time period.

In some embodiments, the plan defines that stimulation will be delivered at every heart beat during the selected time period. Alternatively, the plan defines delivering stimulation at spaced apart beats, for example every $3^{rd}$ beat, every $7^{th}$ beat, every $10^{th}$ beat or intermediate, larger or smaller number of beats.

In some embodiments, treatment for a specific patient is planned so that stimulation will be delivered at selected times of cardiac activity, for example when the heart rate is higher than a certain threshold, or when the heart rate is lower than a certain threshold. Optionally, the threshold is the patient's average heart rate.

In some embodiments, treatment for a specific patient is planned so that stimulation will be delivered during selected physiological and/or physical states of the patient, for example, stimulation is delivered only during sleeping; stimulation is delivered only during rest; stimulation is delivered only during physical activity; or the like.

In some embodiments, a fixed dose is defined, for example, a defined total amount of stimulations to be delivered per day. Optionally, the rate of stimulation during the day is controlled in real time based on one or more of:

- patient's activity (for example, delivering more stimulations when the patient is active as compared to when the patient is resting, or vice versa);
- conditions of the patient surroundings, such as weather conditions (for example, delivering more stimulations when the surrounding temperature (optionally as sensed by a system temperature sensor) is within a range or under or over a selected threshold. For example, in temperatures in which it may be harder to maintain body temperature, such as higher than 35 degrees C., lower than 5 degrees C.) it may be desired to reduce the rate of applying cardiac electrical stimulation;
- the patient's posture, for example, delivering more stimulations when the patient is standing and less when the patient is sitting and/or laying down, or vice versa.

Optionally, the patient's posture is sensed using a sensor, such as a gyro and/or other inertial motion sensor.

In some embodiments, the device is configured for detection of conditions suitable for delivering the stimulation. In some embodiments, the device is configured for detection of cardiac activity, such as via an ECG measurement performed by a device electrode. Optionally, the measured cardiac activity also provides an indication of physical activity performed by the patient, and if the patient is at an active state or at a rest state.

In another example, the device is configured for detection of physical and/or physiological states of the patient so as to deliver the stimulation in a preferred state. For example, the device is configured for detecting sleep or wake states. For example, the device is configured to determine the patient's posture. For example, the device is configured to detect if the patient is performing physical activity, such as walking. In some embodiments, determination of the patient's activity and/or status and/or posture is performed based on input from one or more sensors, such as a GPS, gyro, microphone, and/or others. Optionally, the sensors are configured on a user's personal device such as a cell phone, which communicates with the stimulation device controller.

Additionally or alternatively, indications and/or conditions of the patient are inputted into the device (e.g. via a user interface) so as to set the applying of cardiac electrical stimulation accordingly. For example, to set the applying when cardiac activity is at certain characteristics (e.g. heart rate) and/or when the patient is at certain physical state and/or physiological states.

In some embodiments, the patient may voluntarily affect treatment (e.g. via the user interface), for example, by setting preferred hours (e.g. during a day) in which stimulation should be delivered. In an example, the patient may ask to be treated one hour during the morning, and another hour during the evening. In some embodiments, the system (e.g. via the system controller and user interface) is configured to suggest the patient options for treatment time and/or stimulation rate and/or stimulation intensity, and the patient can select from the available options based on their preferences.

In some embodiments, cardiac electrical stimulation treatment starts and is delivered according to the plan (153).

In some embodiments, optionally, treatment is modified according to a fallback plan so as to comply with actual cardiac activity (155). Optionally, treatment is modified in attempt to reach the general treatment goal, such as the total number of stimulations delivered; a total amount of stimulation energy; delivery during a certain amount of specific heart beats (e.g. heart beats immediately following an irregular cardiac event); and/or other general treatment goal.

Some examples of situations in which treatment may be modified from an original plan to a fallback plan include: a change in actual heart rate from an expected (e.g. average) heart rate; irregular cardiac events (e.g. arrhythmia), delivery of a different signal to the heart, such as a defibrillation signal.

The following are examples of scenarios in which modification of the treatment plan, optionally according to a fallback plan, may take place:

- The original plan defines delivery of cardiac electrical stimulation when the patient's heart rate is between 60-100 bpm, and that the patient should be treated for a total of at least one hour a day (within a 24 hour window). However, in a 23 hour time period, the patient's heart rate did not reach the defined bpm range. In such case, the original plan may be modified to deliver, within the remaining hour of the 24 hour window, stimulation at any heart rate.

FIG. 2A schematically shows scheduled cardiac electrical stimulation dosing and modified cardiac electrical stimulation dosing which compensates for changes in the scheduled dosing due to actual cardiac activity, according to some embodiments.

In some embodiments, stimulation 2001 is planned to be applied with intervals between consecutive stimulations, for example, stimulation is scheduled to be applied with an interval 2003 of 6 heart beats (as shown), of 4 heart beats, 2 heart beats, 10 heart beats or intermediate, larger or smaller number of heart beats constituting the interval. In some cases, the scheduled stimulation is modified in real time based on actual cardiac activity. For example, an event 2005 such as an irregular beat is detected, optionally by the device (such as via ECG measurement). Optionally, the device is configured not to stimulate during an irregular beat, so a scheduled stimulation is skipped. As shown in the lower bar, due to the detected cardiac event and skipped stimulation, the next stimulation is applied at a 12-beat interval.

In some embodiments, to compensate for a skipped stimulation, a total duration 2007 of a treatment session is lengthened, so that another stimulation may be delivered in order to reach a total desired amount of stimulations within the session.

FIG. 2B schematically shows optional cardiac electrical stimulation treatments set in accordance with a total amount of stimulation energy to be delivered, according to some embodiments. In this example, a total amount of cardiac electrical stimulation energy 2015 is set as a general goal for treatment. To reach this amount, stimulation may be delivered as a plurality of stimulations at an equal intensity 2017, optionally delivered with intervals in between (see 2B1) or in a serial manner (see 2B2). Alternatively, (see 2B3), a plurality of stimulations 2019, 2021 may differ in intensity from each other, so that the sum of the stimulations reaches the set total amount of energy.

In some embodiments, where stimulation causes pain or sensation to the patient, the current intensity is reduced. Optionally, if stimulation does not cause pain (or the pain is bearable to the specific patient), current intensity may be increased, potentially shortening the total number of stimulations needed and/or the total duration of treatment.

Some examples of energy settings may include: reaching a total amount of 100 jouls of cardiac electrical stimulation energy per day; a total amount of 5 jouls of cardiac electrical stimulation energy per hour; a total amount of 0.1 jouls of cardiac electrical stimulation per minute; and/or other.

In some embodiments, a total amount of energy to be delivered is calculated (for example automatically calculated by the device controller) by multiplying the number of stimulation pulses by the stimulation current amplitude and/or by multiplying the number of stimulation pulses by an output voltage (for example, the voltage released by the pulse generator).

FIG. 3 is a flowchart of a method for setting and/or modifying cardiac electrical stimulation treatment dosing, according to some embodiments.

In some embodiments, cardiac electrical stimulation treatment is planned to provide a set dose (SD) of stimulations (i.e. stimulation pluses) during a set time period (TP) (301). In some embodiments, the set time period includes 1 day, a set number of hours (e.g. 1, 2, 5, 10, 15, 20 or intermediate, longer or shorter duration); a set number of minutes (e.g. 5 minutes, 10 minutes, 30 minutes, 45 minutes or intermediate, longer or shorter duration). Some examples of doses set per time periods include 25,000 stimulation pulses a day; 1000 stimulation pulses per hour; 20 stimulation pulses per minute or intermediate, higher or smaller amount of set pulses.

In some embodiments, cardiac electrical stimulations are delivered according to the set schedule (303). Then, at the end of the set time period, the number of actual stimulation pulses (NSP) delivered during the set time period are calculated (305). (Optionally, the number of actual pulses delivered is a counted by the device controller).

In some cases, the number of actual stimulation pulses (NSP) may differ from the set dose (SD), for example, be smaller than the set dose (307). This may occur, in some cases, due to skipped stimulations, for example in view of irregular heart beats, in view of the actual heart rate not being within a defined range suitable for stimulation, and/or other circumstances which caused the delivered stimulation to differ from the planned one.

In case the number of actual stimulation pulses is smaller than the set dose, the schedule may be updated to deliver more stimulations during a similar upcoming time period (309); or, alternatively, be updated to deliver less stimulations during a similar upcoming time period, so as to comply with the "real life" likelihood of delivering the planned stimulations (311).

In some embodiments, stimulation is applied only if and when a patient's rate heart is higher or lower than a set threshold, or within a defined range. Optionally, the threshold is dynamically modified in view of actual cardiac activity so at to reach the set dose (such as to reach the set number of stimulation).

In some embodiments, the cardiac electrical stimulation is planned for delivery at each heart beat over a certain time period (e.g. over several hours a day); additionally or alternatively, stimulation is planned for delivery every set number of heart beats; additionally or alternatively, the plan defines stimulation time(s) and off-time during which stimulation is not delivered.

In some embodiments, planning is performed (and/or the treatment plan is modified) according to an actual stimulation pulses delivered during one or more previous treatment sessions and recorded by the device. For example, if the number of stimulation pulses that were actually delivered during a previous treatment session was only 20%, 50%, 75% or intermediate, higher or lower percentage of the planned number of stimulation, a time period for the next treatment may be adjusted (e.g. lengthened) and/or the number of stimulation pulses to be provided during a time period identical to that of the previous session may be reduced, to be closer to the number of stimulation pulses actually delivered.

In an example, if the number of stimulation pulses delivered during a 5 hour treatment session was only 50% of the planned number of stimulation pulses, the plan can be modified by lengthening the treatment session to 10 hours, for example so as to reach the predefined number of stimulation pulse.

In an example, if the number of stimulations pulses that were actually delivered is lower than the planned total number of stimulations by more than 10%, 20%, 25%, 30% or intermediate, higher or smaller percentage, the plan can be modified (e.g. by lengthening the treatment session duration).

Exemplary Devices and Systems for Cardiac Electrical Stimulation

FIG. 4A is a schematic block diagram of a cardiac therapy device 200, in accordance with some embodiments of the invention.

Device 200, as shown, includes one or more leads 216 (optionally two leads), which are optionally couplable to device 200 at one or more can connectors (not shown).

A pulse generator 204 is optionally used to generate the signal, for example, including a power circuitry, for example, including one or more storage capacitors.

In some embodiments of the invention, a ventricular detector 206 is provided and used to detect atypical ventricular activation, which can be a contra-indication to signal application.

In some embodiments of the invention, an atrial detector 208 is provided and used to detect atypical atrial activation, which may be used as an input to decision making by device 200.

A sensor input 214 may receive data from one or more sensors, for example electrical sensors or other sensors, such as flow, pressure and/or acceleration sensors. Data from the sensors is optionally further processed (e.g., by a controller 202 and/or detectors 206, 208) and are optionally be used as an input to decision making processes in device 200.

A controller 202 is optionally provided and executes one or more logics to decide, for example, a timing and/or other parameters of a signal and/or if a signal is to be applied.

In some embodiments, the controller controls the applying of stimulation pulses according to the treatment plan. Optionally, the controller effects a change in the plan, for example so as to compensate for real time deviations from the treatment plan (e.g. a skipped stimulation). In some embodiments, the controller generates commands for electrifying one or more leads of the device with a stimulation signal. Optionally, commands are generated according to the treatment plan. In some embodiments, upon a command generated by the controller, electrical current is conducted via the one or more leads and optionally to tissue contacted by the one or more leads.

A memory 218 is optionally provided, for example, to store logic, past effects, therapeutic plan, adverse events and/or pulse parameters.

In some embodiments, the controller and/or memory are programmed with one or more treatment plans (optionally set for the specific patient) and/or with one or more fallback treatment plans.

In some embodiments, instructions for "compensating" for a change from the planned treatment are stored and are addressed by the device controller when relevant, including for example modifications in treatment duration, number of stimulations, stimulation signal parameters (e.g. current intensity), and/or other modifications which may be applied to compensate for a real time change in the original plan. In some embodiments, the instructions include numerical factors according to which one or more parameters of treatment are modified. In some examples, the instructions may include: a factor by which the stimulation current intensity should be multiplied in case the actual applied stimulations did not reach the target amount of energy; a factor by which output voltage should be modulated to result in the desired current intensity; a factor by which the stimulation rate should be multiplied in case the actual applied stimulation did not reach the target total number of stimulations (optionally within a set time period); time related modifications such as factors by which the treatment session duration should be lengthened in case a target was not reached; and the like.

In some embodiments, the controller refers to a look up table or the like which ties between specific situations (e.g. a skipped stimulation, number of actual stimulations delivered being lower than planned, etc.) and the instructions for compensating for that situation (e.g. by updating one or more parameters, such as updating the length of a treatment session).

A logger 210 is optionally provided to store activities of device 200 and/or of the patient. Such a log and/or programming may use a communication module 21 (e.g., of a type known in the art) to send data from device 200, for example, to a programmer (not shown) and/or to receive data, for example, programming, for example, pulse parameters.

FIG. 4B is a schematic diagram showing components of an implantable cardiac device 600, according to some embodiments.

In some embodiments, the device is configured for delivery of cardiac electrical stimulation, such as cardiac contractility modulation stimulation. Optionally, the device is further configured to function as cardioverter defibrillator (ICD).

In some embodiments, the device comprises an ICD lead 601, and a cardiac contractility modulation lead 603.

In some embodiments, activation of the ICD lead is by an ICD module which includes or is connected to: ICD control 605, a defibrillation pulse generator 607 (via one or more capacitors 609), a power source (e.g. a battery 613) and power source management circuitry 615, and ICD sense 611 which senses an applied pulse to verify the pulse is within a selected (e.g. programmed) amplitude and/or duration. In some embodiments, activation of the one or more cardiac contractility modulation leads 621, 623, which are optionally positioned in the right ventricle, is by a cardiac contractility modulation module which includes or is connected to: cardiac contractility modulation control 617, a cardiac contractility modulation generator 619.

It is noted that in some embodiments, the ICD coil and one more electrodes for pacing and/or cardiac contractility modulation are configured on the same lead.

In some embodiments, the leads are connected to isolation 625.

In some embodiments, the device comprises a housekeeping module 627, which includes or is connected to one or more sensor such as a temperature sensor 629, a magnetic sensor 631, and communication means 633 such as an antennae, a receiver and the like. Other sensors may include flow sensors, pressure sensors, acceleration sensors, and/or other.

In some embodiments, data received from the one or more sensors is received as input. Optionally, the input is processed by the device control (e.g. by the ICD control, cardiac contractility modulation control, and/or a general controller, not shown) and is optionally used as input to decision making processes in device 600.

In some embodiments, the device control (e.g. the ICD control, cardiac contractility modulation control, and/or a general controller, not shown) executes one or more logics to decide, for example, a timing and/or other parameters of a signal and/or if a signal is to be applied.

A memory (not shown) is optionally provided, for example, to store logic, past effects, therapeutic plan, adverse events and/or pulse parameters.

A logger (not shown) is optionally provided to store activities of device 600 and/or of the patient. Such a log and/or programming may use a communication module 633 to send data from device 600, for example, to a programmer (not shown) and/or to receive data, for example, programming, for example, pulse parameters.

FIG. 5A schematically illustrates an implanted device configured for applying cardiac electrical stimulation, according to some embodiments.

In some embodiments, implantable device 501 comprises a pulse generator 503. In some embodiments, pulse generator 503 comprises a housing 509 which encases, for example: powering means (e.g. a battery), control circuitry (e.g. a controller) configured for timing and generating the electrical pulses, sensing circuitry, communication circuitry, memory means, and/or other operational modules.

In some embodiments, one or more stimulation leads such as 505, 507 are connected to the housing and extend externally from it. In some embodiments, a lead comprises one or more electrical wires, surrounded by an external insulating layer. In some embodiments, a lead is comprised of two wires, having different polarities. In some embodiments, a wire of the lead is coiled.

In some embodiments, pulse generator 503 is implanted outside the heart, for example in the subclavian area. Optionally, implantation is via a minimally invasive procedure.

In some embodiments, a housing of pulse generator 503 is implanted subcutaneously, in proximity of the left chest.

In some embodiments, leads 505 and 507 extend from pulse generator 503, and at least a distal segment of the leads is implanted within the heart 511. In some embodiments, as shown, both leads are passed through the right atrium 513, and contact, at their distal ends, the ventricular septum 515. In some embodiments, each lead contacts the septum at a different location.

It is noted that additionally or alternatively, a single lead which includes two spaced apart stimulation electrodes may be used.

It is also noted that while the figures shows both leads being positioned in the right ventricle 531 against ventricular septum 515, one or more stimulating leads may be in other locations, with consequently different effect circles and/or targeting different tissues. In some embodiments, the leads are located inside the heart, on the right side thereof optionally to take advantage of two potential advantages: a. less out-of-heart tissue being stimulated; and b. less invasive access and/or presence than in the left heart.

In some embodiments, one of the leads is implanted outside the heart, and the other lead is implanted inside the heart.

In some embodiments, each of the leads ends with a tip electrode (see 517 of lead 507, 519 of lead 505). The tip electrode may be configured as a contact electrode, a screw-in electrode, a sutured electrode, a free-floating electrode and/or other types.

In some embodiments, one or both of the leads includes a ring electrode (see 521 of lead 507, 523 of lead 505), located along the lead, proximally to the tip electrode.

In some embodiments, the electrodes are implanted in the right ventricle or in the right atria of the heart.

In some embodiments, a tip electrode is formed with a threading so as to be threaded into the tissue. Alternatively, a tip electrode is solely placed in contact with the tissue.

In some embodiments, one or both of the leads includes a defibrillation coil (see 525 of lead 505). Optionally, coil 525 is located along the lead, proximally to the tip electrode and/or proximally to the ring electrode.

In some embodiments, the coil is implanted in the right ventricle, right atria or in the vena cava.

In some embodiments, one or both leads are configured to deliver a non-excitatory signal such as a cardiac contractility modulation signal.

In some embodiments, the cardiac contractility modulation signal is applied in contact with the ventricular tissue or within ventricular tissue.

In some embodiments, the cardiac contractility modulation signal is applied to the heart during a relative and/or absolute refractory period of the heart. In some embodiments, the signal is selected to increase the contractility of a cardiac ventricle when the electric field of the signal stimulates such ventricular tissue, for example, the left ventricle, the right ventricle and/or a ventricular septum. In some embodiments of the invention, contractility modulation is provided by phosphorylation of phospholamban caused by the signal. In some embodiments of the invention, contractility modulation is caused by a change in protein transcription and/or mRNA creation caused by the signal, optionally in the form of reversal of a fetal gene program. It is noted that in some embodiments the cardiac contractility modulation signal may be excitatory to tissue other than that to which it is applied.

While not being limited to a single pulse sequence, the term cardiac contractility modulation is used to describe any of a family of signals which includes a significant component applied during an absolute refractory period and which has a clinically significant effect on cardiac contractility in an acute and/or chronic fashion and/or which causes a reversal of fetal gene programs and/or which increases phosphorylation of phospholamban. In some embodiments, the signal is potentially excitatory to one part of the heart but non-excitatory to other parts. For example, a signal can be excitatory in atria, but applied at a timing (relative to ventricular activation) when it is not excitatory in the ventricle.

In some embodiments of the invention, the signal while potentially stimulatory during the receptive period of the cardiac cycle, is non-excitatory due to its timing. In particular, the signal is applied during the refractory period of the tissue which is affected by it and, optionally, within the absolute refractory period.

In some embodiment, a device electrode, for example the cardiac contractility modulation applying electrode, is used for measuring the R wave amplitude and/or RR interval of the cardiac cycle.

FIG. 5B schematically illustrates a cardiac device comprising a plurality of leads, according to some embodiments. In some embodiments, device 5500 is configured for delivering cardiac contractility modulation stimulations to the heart. In some embodiments, device 5500 is further configured to function as a cardiac defibrillator (ICD).

In some embodiments, device 5500 comprises a plurality of leads. In the example shown, a first lead 5510 extends to the right atrium of the heart 5516; a second lead 5511, such as for applying cardiac contractility modulation stimulation, extends to the right ventricle, optionally contacting the ventricular septum; a third lead 5512 extends to the right ventricle, optionally contacting the ventricular septum; and a fourth lead 5514 extending to the left ventricle, for example through the coronary sinus. In some embodiments, one or more of the leads comprises a defibrillation coil. In this example, lead 5512 comprises a superior-vena cava shock coil 3330 and a right ventricle shock coil 5532.

In some embodiments, the plurality of leads are connected to the device housing 5520 via a plurality of ports (not shown). In some embodiments, control of activation of one or more leads is via switch circuitry, for example switch circuitry of the device controller.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of operating a cardiac electrical stimulation device, the device comprising a memory in which an initial treatment plan is defined, the initial treatment plan including parameters according to which cardiac electrical stimulations are applied to the heart; the method comprising:
    generating, via a device controller and according to said initial treatment plan, commands for electrifying one or more leads of said device with a cardiac electrical stimulation signal;
    sensing actual cardiac activity using one or more sensors;
    changing the commands to adapt the treatment to said actual cardiac activity as sensed by said one or more sensors;
    automatically generating an updated treatment plan, at said device controller, at least one of said parameters to compensate for changes made relative to said initial treatment plan due to said sensed actual cardiac activity;
    selecting, in the updated treatment plan, a parameter representing a total number of stimulations to be delivered to the heart over a first selected period of time;
    generating commands to deliver stimulations to the heart, wherein said generating takes into account said selecting; and
    counting the number of stimulations generated;
    when the number of stimulations generated during the first selected time period is lower than said selected total number of stimulations, adding a second selected time period at an extent sufficient to deliver the required additional stimulations.

2. The method according to claim 1, wherein said parameters include one or more of: a rate of cardiac electrical stimulations; a time period over which cardiac electrical stimulations are to be applied; stimulation current; an output voltage; a duration of each stimulation.

3. The method according to claim 2, wherein said automatically generating an updated treatment plan comprises one or more of: increasing or reducing said rate of cardiac electrical stimulations; lengthening or shortening said time period over which cardiac electrical stimulations are applied; increasing or reducing said stimulation current intensity; lengthening or shortening said stimulation duration.

4. The method according to claim 1, wherein said parameters are selected and/or updated to obtain a total number of cardiac electrical stimulations and/or a total amount of cardiac electrical stimulation energy.

5. The method according to claim 1, wherein said initial treatment plan is defined and/or updated according to measured and/or received input of cardiac activity characteristics of a patient being treated.

6. The method according to claim 5, wherein said cardiac activity characteristics include: average heart rate, average stroke volume, occurrence rate of irregular cardiac events.

7. The method according to claim 5, wherein said actual cardiac activity comprises irregular cardiac events from the group of: premature ventricular contraction (PVC), atrial arrhythmia or ventricle arrhythmia.

8. The method according to claim 1, wherein said device is an implanted device and wherein said one or more leads contact the ventricular septum of the heart.

9. The method according to claim 1, comprising measuring said actual cardiac activity using said one or more sensors.

10. The method according to claim 1, wherein said initial treatment plan is defined according to at least one of:
one or more thresholds of a heart rate during which said commands are to be generated; and
one or more physical states of the patient during which said commands are to be generated.

11. The method according to claim 1, wherein said automatically generating an updated treatment plan is performed in response to one or more skipped cardiac electrical stimulations.

12. The method according to claim 1, wherein said automatically generating an updated treatment plan is performed if at least one of the following:
a number of cardiac electrical stimulations that were actually delivered is lower than a planned number of cardiac electrical stimulations; and
a total amount of cardiac electrical stimulation energy delivered is lower than a planned amount of cardiac electrical stimulation energy.

13. The method according to claim 1, wherein said cardiac electrical stimulation comprises cardiac contractility modulation stimulation.

14. The method according to claim 1, comprising adding said second selected time period to generate additional stimulations when said number of stimulations generated is lower than 90% of said selected total number of stimulations.

15. The method according to claim 1, wherein said adding a second selected time period comprises extending said first selected period of time.

16. The method according to claim 1, comprising, when said number of stimulations generated during the first selected time period is lower than said selected total number of cardiac electrical stimulations, reducing said selected total number of cardiac electrical stimulations for a future stimulation session.

17. The method according to claim 1, wherein said first selected time period is between 4 hours-8 hours a day.

18. The method of claim 1, further comprising:
selecting the parameter of a total amount of energy to be delivered by cardiac electrical stimulations to the heart, of said updated treatment plan; and
selecting one or both of: a time period during which cardiac electrical stimulations are to be applied to the heart, and stimulation current intensity for each of the stimulations of a first treatment session, said time period and said stimulation current intensity selected so as to reach said selected total amount of energy.

19. The method according to claim 18, further including determining one or both of an adjustment of said time period and an adjustment of said stimulation current intensity for a second treatment session, said determining based on measured cardiac activity during said first treatment session.

20. A system for cardiac electrical stimulation treatment, comprising:
an implantable pulse generator;
one or more leads extending from said pulse generator to the heart for applying cardiac electrical stimulation;
a controller programmed with at least one treatment plan for applying cardiac electrical stimulations, said controller configured to automatically generate an updated treatment plan in response to measured cardiac activity by updating one or more parameters including: a time period during which cardiac electrical stimulations are applied; a total number of cardiac electrical stimulations; a total amount of cardiac electrical stimulation energy; and an amount of energy delivered at each cardiac electrical stimulation;
wherein said controller is configured to automatically generate said updated treatment plan when a number of cardiac electrical stimulations that were actually delivered is lower than a planned number of cardiac electrical stimulations.

21. The system according to claim 20, comprising one or more sensors including an ECG sensor configured for measuring said actual cardiac activity.

22. The system according to claim 21, wherein said controller is configured to deduce one or more of: an average heart rate, an average stroke volume, an occurrence rate of irregular cardiac events based on data acquired by said one or more sensors.

23. The system according to claim 22, wherein said irregular cardiac events are from the group of: premature ventricular contraction (PVC), atrial arrhythmia or ventricle arrhythmia.

24. The system according to claim 20, wherein said one or more leads are adapted to contact the ventricular septum of the heart.

25. The system according to claim 20, wherein said controller is programmed with instructions for automatically generating said updated treatment plan, said instructions suitable to compensate for real time changes in said treatment plan.

26. The system according to claim 25, wherein said instructions include numerical factors according to which one or more of the following parameters are updated: stimulation current intensity; output voltage which sets a selected stimulation current intensity; stimulation duration; treatment session duration; stimulation rate.

27. The system according to claim 20, wherein said controller is configured to select and/or update parameters to obtain a total number of cardiac electrical stimulations and/or a total amount of cardiac stimulation energy.

28. The system according to claim 20, wherein said controller is configured for: increasing or reducing a rate of cardiac electrical stimulations; lengthening or shortening said time period over which cardiac electrical stimulations are applied; increasing or reducing stimulation current intensity; lengthening or shortening a stimulation duration.

29. The system according to claim 20, wherein said controller is configured to at least one of:
set and/or receive as input one or more thresholds of a heart rate during which said cardiac electrical stimulations are applied; and
set and/or receive as input one or more physical states of the patient during which said cardiac electrical stimulations are applied.

30. The system according to claim 20, wherein said controller is configured to automatically generate said updated treatment plan in response to one or more skipped cardiac electrical stimulations.

31. The system according to claim 20, wherein said controller is configured to set a number of cardiac electrical stimulations to be delivered within a set time period.

32. A system for cardiac electrical stimulation treatment, comprising:
an implantable pulse generator;
one or more leads extending from said pulse generator to the heart for applying cardiac electrical stimulation;
a controller programmed with at least one treatment plan for applying cardiac electrical stimulations, said controller configured to automatically generate an updated treatment plan in response to measured cardiac activity by updating one or more parameters including: a time period during which cardiac electrical stimulations are applied; a total number of cardiac electrical stimulations; a total amount of cardiac electrical stimulation energy; and an amount of energy delivered at each cardiac electrical stimulation;

wherein said controller is configured to set a number of cardiac electrical stimulations to be delivered within a set time period of 24 hours.

\* \* \* \* \*